US011047326B2

(12) United States Patent
Anzawa

(10) Patent No.: US 11,047,326 B2
(45) Date of Patent: Jun. 29, 2021

(54) MISFIRE DETECTION DEVICE FOR INTERNAL COMBUSTION ENGINE, MISFIRE DETECTION SYSTEM FOR INTERNAL COMBUSTION ENGINE, DATA ANALYZER, CONTROLLER FOR INTERNAL COMBUSTION ENGINE, METHOD FOR DETECTING MISFIRE IN INTERNAL COMBUSTION ENGINE, AND RECEPTION EXECUTION DEVICE

(71) Applicant: TOYOTA JIDOSHA KABUSHIKI KAISHA, Toyota (JP)

(72) Inventor: Takumi Anzawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/820,799

(22) Filed: Mar. 17, 2020

(65) Prior Publication Data
US 2020/0309053 A1 Oct. 1, 2020

(30) Foreign Application Priority Data
Mar. 29, 2019 (JP) .............................. JP2019-065885

(51) Int. Cl.
*F02D 41/14* (2006.01)
*F02D 13/02* (2006.01)
(Continued)

(52) U.S. Cl.
CPC ..... *F02D 41/1497* (2013.01); *F02D 13/0223* (2013.01); *F02D 41/068* (2013.01); *F02P 5/05* (2013.01)

(58) Field of Classification Search
CPC ............ F02D 41/1497; F02D 13/0223; F02D 41/024; F02D 41/068; F02D 41/1405;
(Continued)

(56) References Cited

U.S. PATENT DOCUMENTS 5,093,792 A * 3/1992 Taki ..................... F02D 35/023
701/111
5,263,364 A * 11/1993 Nakayama .......... F02D 41/1498
701/110
(Continued)

FOREIGN PATENT DOCUMENTS

DE 10345187 A1 6/2004
DE 102013208853 A1 11/2013
(Continued)

OTHER PUBLICATIONS

Office Action dated Dec. 17, 2020 in U.S. Appl. No. 16/820,815.
(Continued)

*Primary Examiner* — Sizo B Vilakazi
(74) *Attorney, Agent, or Firm* — Oblon, McClelland, Maier & Neustadt, L.L.P.

(57) ABSTRACT

A misfire detection device for an internal combustion engine includes a storage device and processing circuitry, the storage device stores first mapping data corresponding to a case where a warm-up process of a catalyst provided in an exhaust passage of an internal combustion engine is being executed, and second mapping data corresponding to a case where the warm-up process is not being executed, and each of the first mapping data and the second mapping data uses a rotation waveform variable as an input and defines a mapping that outputs a misfire variable that is a variable related to a probability misfire has occurred. The rotation waveform variable is a variable indicating a difference between a plurality of values of an instantaneous speed variable respectively corresponding to a plurality of different minute angular intervals.

11 Claims, 10 Drawing Sheets

(51) Int. Cl.
*F02P 5/05* (2006.01)
*F02D 41/06* (2006.01)

(58) Field of Classification Search
CPC ....... F02D 2041/001; F02D 2200/1015; F02D 13/0261; F02D 41/1456; F02P 5/05; F02P 5/1506; G01M 15/11; B60W 10/06; F01N 3/20

See application file for complete search history.

(56) References Cited

U.S. PATENT DOCUMENTS

| | | | |
|---|---|---|---|
| 5,495,415 A | 2/1996 | Ribbens et al. | |
| 5,728,941 A | 3/1998 | Yamamoto et al. | |
| 6,199,057 B1 | 3/2001 | Tawel | |
| 6,434,541 B1 | 8/2002 | Tawel et al. | |
| 8,261,603 B2 * | 9/2012 | Kondo | G01M 15/11 73/114.03 |
| 8,855,888 B2 * | 10/2014 | Suzuki | F02D 29/00 701/99 |
| 9,476,335 B2 * | 10/2016 | Teraya | B60W 20/1082 |
| 2007/0186903 A1 * | 8/2007 | Zhu | F02D 41/0255 123/406.37 |
| 2010/0050753 A1 | 3/2010 | Suzuki | |
| 2014/0261317 A1 | 9/2014 | Loucks et al. | |
| 2016/0152231 A1 | 6/2016 | Sugimoto | |
| 2020/0263617 A1 | 8/2020 | Hashimoto et al. | |
| 2020/0263624 A1 | 8/2020 | Muto et al. | |
| 2020/0264074 A1 | 8/2020 | Hashimoto et al. | |
| 2020/0309054 A1 | 10/2020 | Anzawa | |
| 2020/0309055 A1 | 10/2020 | Anzawa | |

FOREIGN PATENT DOCUMENTS

| | | |
|---|---|---|
| JP | 01-301946 A | 12/1989 |
| JP | 04-091348 A | 3/1992 |
| JP | H04-259669 A | 9/1992 |
| JP | 05-195858 A | 8/1993 |
| JP | H09-42041 A | 2/1997 |
| JP | 09-166042 A | 6/1997 |
| JP | H10-110649 A | 4/1998 |
| JP | 10-252536 A | 9/1998 |
| JP | 2001-507772 A | 6/2001 |
| JP | 2002-004936 A | 1/2002 |
| JP | 2009-174397 A | 8/2009 |
| JP | 2010-053730 A | 3/2010 |
| JP | 2017-110595 A | 6/2017 |
| JP | 2017-155712 A | 9/2017 |
| JP | 2018-135844 A | 8/2018 |
| JP | 2018-159349 A | 10/2018 |
| JP | 2018-178810 A | 11/2018 |

OTHER PUBLICATIONS

Notice of Allowance issued Mar. 15, 2021 in related U.S. Appl. No. 16/820,815.
Corrected Notice of Allowability dated Apr. 2, 2021 in related U.S. Appl. No. 16/820,815.

* cited by examiner

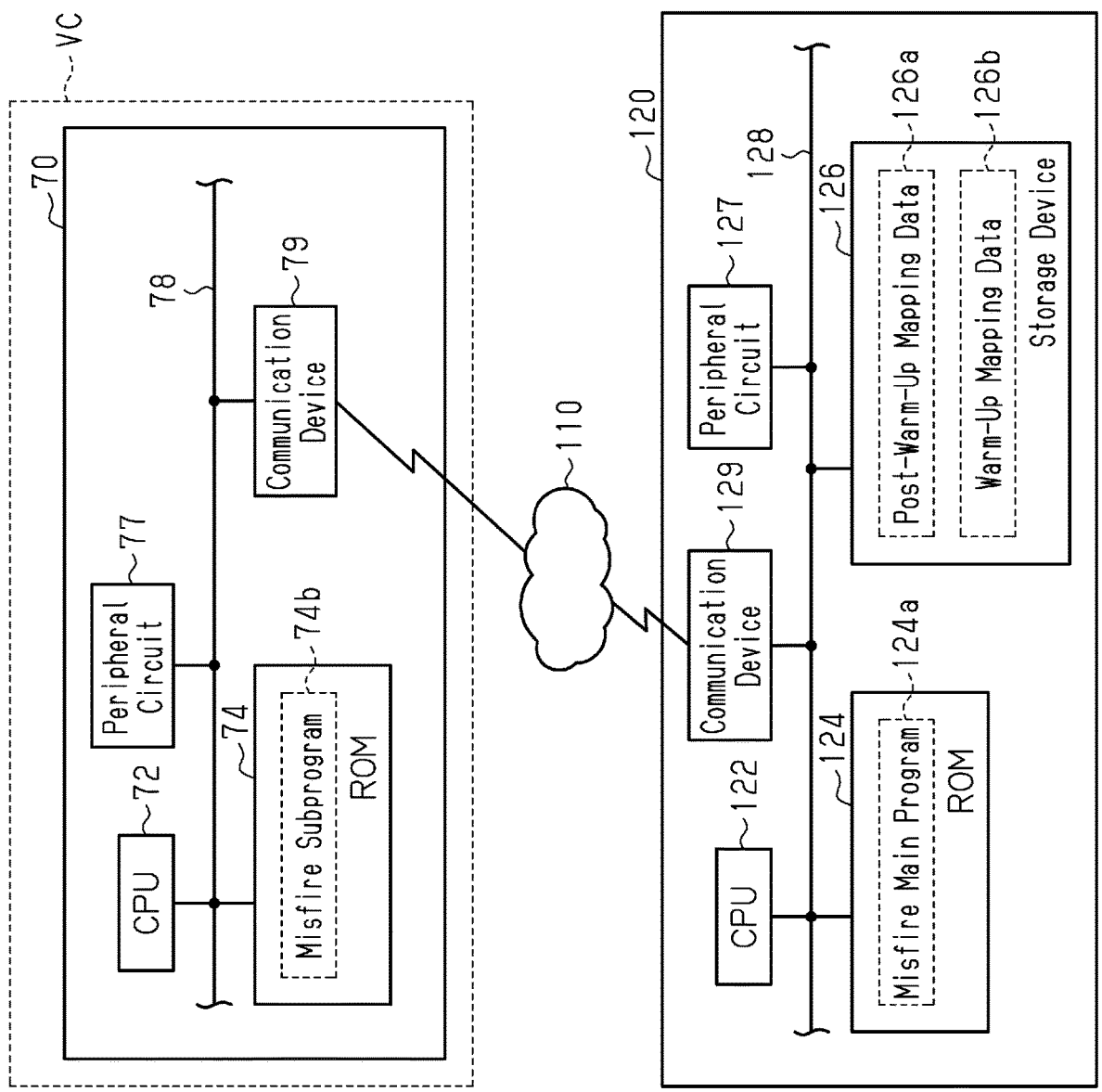

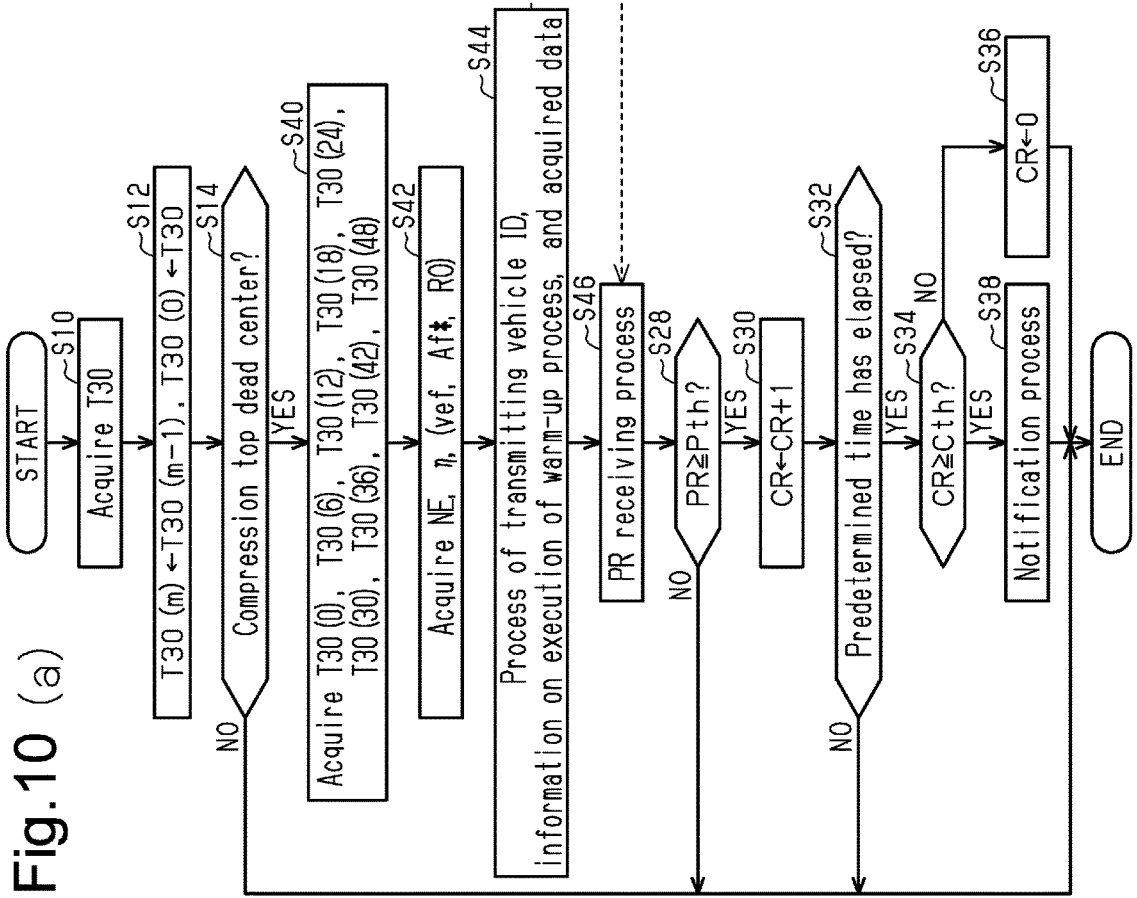

MISFIRE DETECTION DEVICE FOR INTERNAL COMBUSTION ENGINE, MISFIRE DETECTION SYSTEM FOR INTERNAL COMBUSTION ENGINE, DATA ANALYZER, CONTROLLER FOR INTERNAL COMBUSTION ENGINE, METHOD FOR DETECTING MISFIRE IN INTERNAL COMBUSTION ENGINE, AND RECEPTION EXECUTION DEVICE

BACKGROUND

Field

The present disclosure relates to a misfire detection device for an internal combustion engine, a misfire detection system for an internal combustion engine, a data analyzer, a controller for an internal combustion engine, a method for detecting misfire in an internal combustion engine, and a reception execution device.

Description of Related Art

For example, Japanese Laid-Open Patent Publication No. 2002-4936 describes an apparatus for determining the presence of misfire based on a comparison between a rotational speed difference and a determination value. Two cylinders that consecutively reach the compression top dead centers in time series are referred to as adjacent cylinders. The rotational speed difference means the difference between the rotational speed of the crankshaft resulting from the combustion stroke in one of the adjacent cylinders and the rotational speed of the crankshaft resulting from the combustion stroke in the other one of the adjacent cylinders.

The determination value, which is compared with the rotational speed difference, has a suitable value that varies depending on the operating point of the internal combustion engine and the like. This increases manufacturing steps. Therefore, the inventor has applied mapping that uses a variable indicating the rotational speed difference as an input variable. The mapping outputs a value of a misfire variable which is a variable related to a probability that misfire has occurred by a join operation of the input variable and a parameter learned by machine learning. However, in that case, when the same mapping is used regardless of whether or not the catalyst warm-up process is executed, the structure of the mapping may be complicated. This will increase the calculation load when accurately calculating the value misfire variable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Hereinafter, a plurality of modes and their operation effects of the present disclosure will be described.

Aspect 1. One aspect of the present disclosure is a misfire detection device for an internal combustion engine. The misfire detection device includes a storage device and processing circuitry. The storage device stores first mapping data corresponding to a case where a warm-up process is being executed on a catalyst arranged in an exhaust passage of an internal combustion engine, and second mapping data corresponding to a case where the warm-up process is not being executed, each of the first mapping data and the second mapping data defines a mapping that outputs a misfire variable using a rotation waveform variable as an input. The misfire variable is a variable related to a probability of occurrence of misfire. The processing circuitry is configured to execute an acquisition process that acquires the rotation waveform variable based on a detection value of a sensor configured to detect a rotational behavior of a crankshaft of the internal combustion engine, a determination process that determines whether the misfire is present based on an output of the mapping using the variable acquired by the acquisition process as an input, a handling process that handles the occurrence of a misfire by operating predetermined hardware in a case where it is determined that the misfire has occurred in the determination process, and a selecting process that selects one of the first mapping data and the second mapping data used in the determination process in accordance with whether the warm-up process has been executed. An interval between angles at which compression top dead centers are reached in the internal combustion engine is a reaching interval. A plurality of angular intervals smaller than the reaching interval are a plurality of minute angular intervals, a rotational speed of the crankshaft at each of the plurality of minute angular intervals is an instantaneous speed, and a variable related to the instantaneous speed is an instantaneous speed variable. The rotation waveform variable is a variable indicating a difference between a plurality of values of an instantaneous speed variable respectively corresponding to a plurality of different minute angular intervals. The mapping outputs a value of the misfire variable by performing a join operation of the value of the rotation waveform variable and a parameter learned by machine learning.

In the configuration described above, the input to the mapping includes the rotation waveform variable in view of the fact that the rotational behavior of the crankshaft at different angular intervals differs depending on the presence of misfire. Furthermore, in the configuration described above, the storage device separately stores a mapping according to whether or not the warm-up process is executed, and the processing circuitry changes a mapping that calculates the value of the misfire variable depending on whether or not the warm-up process is executed. Therefore, since each mapping can be a dedicated mapping corresponding to whether or not the warm-up process is executed, the value of the misfire variable can be calculated with high accuracy while simplifying the structure of each mapping. Therefore, in the configuration described above, the value of the misfire variable can be calculated with high accuracy while reducing the calculation load as compared with when performing such processing with a single mapping regardless of whether or not the warm-up process is executed.

Aspect 2. The misfire detection device according to aspect 1 in which input of the mapping defined by the first mapping data for when the warm-up process is executed includes a warm-up operation amount variable that is a variable related to an operation amount of an operation unit of the internal combustion engine by the warm-up process. The acquisition process includes a process that acquires the warm-up operation amount variable when the warm-up process is executed, and the determination process includes a process that determines presence of the misfire based on the output of the mapping that further uses the warm-up operation amount variable acquired by the acquisition process as the input when the warm-up process is executed.

In the configuration described above, the value of the misfire variable reflecting the rotational behavior of the crankshaft corresponding to the warm-up operation amount can be calculated by including the warm-up operation amount variable to the input of the mapping.

Aspect 3. The misfire detection device according to aspect 2 in which the warm-up process includes a process that retards an ignition timing as compared with when the warm-up process is not executed. The warm-up operation amount variable acquired by the acquisition process includes a variable related to a retarded amount of the ignition timing.

As the efficiency at which the combustion energy is converted into torque changes depending on the ignition timing, the rotational behavior of the crankshaft varies depending on the ignition timing. Therefore, in the configuration described above, the value of the misfire variable reflecting the rotational behavior of the crankshaft corresponding to the retarded amount of the ignition timing can be calculated by including a variable related to the retarded amount of the ignition timing in the input to the mapping.

Aspect 4. The misfire detection device according to aspect 2 or 3 in which the internal combustion engine includes a valve characteristic variable device that allows valve characteristics of an intake valve to be varied. The warm-up process includes a process that operates the valve characteristic variable device, and the warm-up operation amount variable acquired by the acquisition process includes a valve characteristic variable that is a variable related to the valve characteristics.

When the valve characteristic of the intake valve is changed, the overlap amount between the valve opening period of the intake valve and the valve opening period of the exhaust valve changes. The internal EGR amount changes according to the overlap amount. The combustion state of the air-fuel mixture in the combustion chamber changes according to the internal EGR amount, and consequently the rotational behavior of the crankshaft changes. Therefore, in the configuration described above, the value of the misfire variable reflecting the rotational behavior of the crankshaft corresponding to the overlap amount can be calculated by including the valve characteristic variable in the input to the mapping.

Aspect 5. The misfire detection device according to any one of aspects 2 to 4 in which the warm-up process includes a process that changes an air-fuel ratio of an air-fuel mixture combusted in a combustion chamber of the internal combustion engine according to a progress status of the warm-up process, and the warm-up operation amount variable acquired by the acquisition process includes an air-fuel ratio variable that is a variable related to the air-fuel ratio.

When the air-fuel ratio is changed, the combustion state of the air-fuel mixture in the combustion chamber changes, and consequently the rotational behavior of the crankshaft changes. Therefore, in the configuration described above, the value of the misfire variable reflecting the rotational behavior of the crankshaft corresponding to the air-fuel ratio can be calculated by including the air-fuel ratio variable in the input to the mapping.

Aspect 6. The misfire detection device according to any one of aspects 1 to 5 in which the input of the mapping includes an operating point variable that is a variable defining an operating point of the internal combustion engine. The acquisition process includes a process that acquires the operating point variable. The determination process is a process that determines the presence of the misfire based on the output of the mapping that further uses the operating point variable acquired by the acquisition process as the input. The mapping outputs a value of the misfire variable by performing a join operation of the rotation waveform variable, the operating point variable, and the parameter learned by the machine learning.

The degree at which the rotational behaviors of the crankshaft differ from each other according the presence of misfire fluctuates according to the operating point of the internal combustion engine. Therefore, for example, when the presence of misfire is determined based on the comparison between the difference between the instantaneous speed variables corresponding to the compression top dead center of each of the two cylinders, that is, the cylinder detected for misfire and the cylinder that differs from the detected cylinder, and the determination value, the determination value needs to be adapted for every operating point. In the configuration described above, since the mapping that outputs the value of the misfire variable by the join operation of the rotation waveform variable, the operating point variable, and the parameter learned by machine learning is the learning target, common parameters can be learned with respect to operating points that differs from each other.

Aspect 7. One aspect of the present disclosure is a misfire detection system for an internal combustion engine. The misfire detection system includes the processing circuitry and the storage device according to any one of aspects 1 to 5. The determination process includes an output value calculation process of calculating an output value of the mapping using a variable acquired by the acquisition process as the input. The processing circuitry includes a first execution device and a second execution device. The first execution device is at least partially mounted on the vehicle and configured to execute the acquisition process, a vehicle-side transmitting process that transmits data acquired by the acquisition process to the outside of the vehicle, a vehicle-side receiving process that receives a signal based on a calculation result of the output value calculation process, and the handling process. The second execution device is disposed outside the vehicle and configured to execute an external-side receiving process that receives data transmitted by the vehicle-side transmitting process, the output value calculation process, the selecting process, and an external-side transmitting process that transmits a signal based on a calculation result of the output value calculation process to the vehicle.

In the configuration described above, the calculation load on the in-vehicle device can be reduced by performing the output value calculation process outside the vehicle.

Aspect 8. One aspect of the present disclosure is a data analyzer including the second execution device and the storage device according to aspect 7.

Aspect 9. One aspect of the present disclosure is a controller for an internal combustion engine. The controller includes the first execution device according to aspect 7.

Aspect 10. One aspect of the present disclosure is a misfire detection method for an internal combustion engine. The acquisition process, the determination process, and the handling process according to any one of aspects 1 to 6 are executed by a computer.

According to the method described above, the same effects as the configurations described in the 1 to 6 above are obtained.

BRIEF DESCRIPTION OF THE DRAWINGS

FIG. 9 is a view showing a configuration of a misfire detection system according to a third embodiment; and FIG. 10 is a flowchart showing a procedure of a process executed by the misfire detection system according to the third embodiment.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment related to a misfire detection device for an internal combustion engine will now be described with reference to the drawings.

Figure 1:
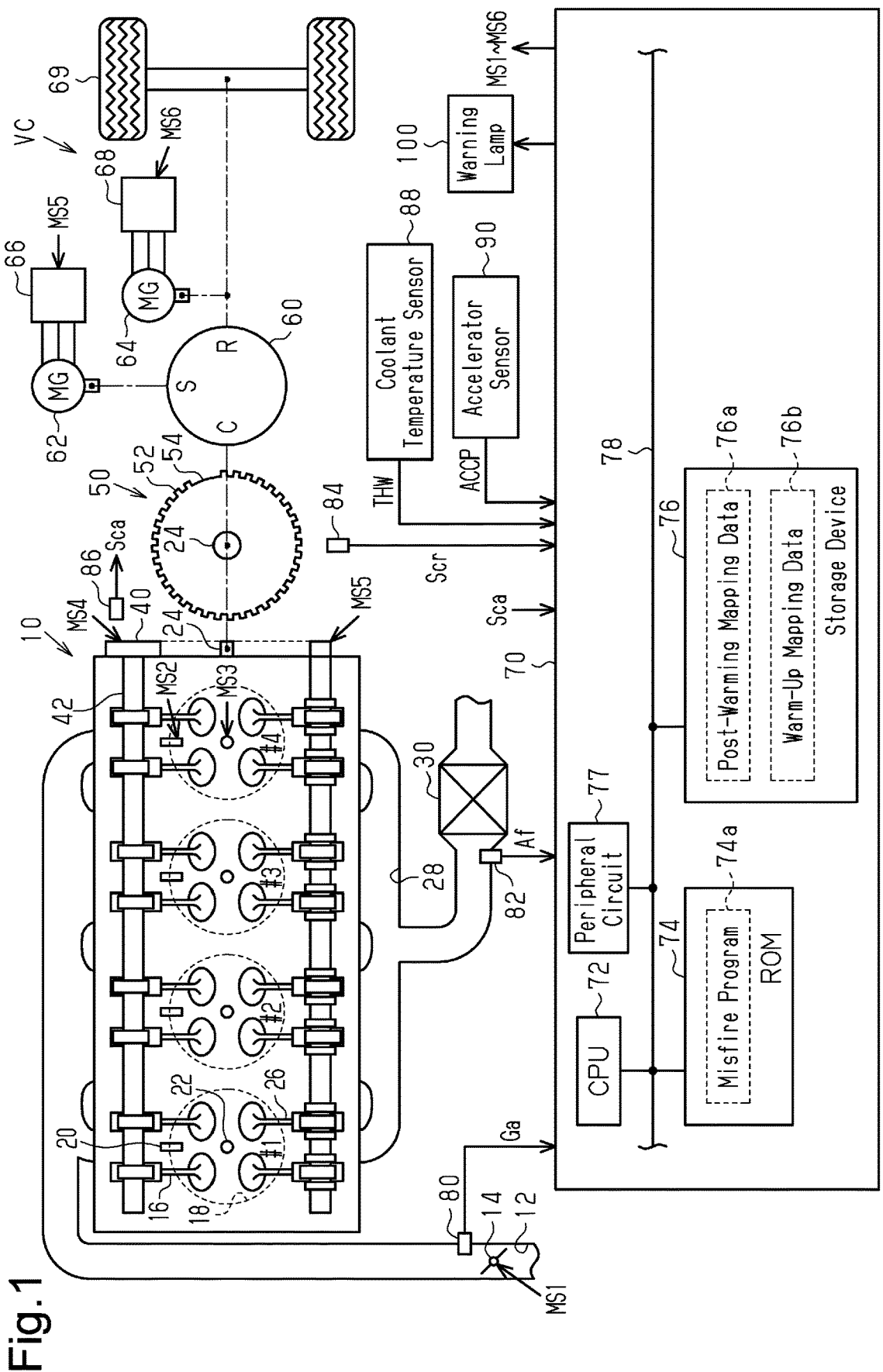
FIG. 1 is a view showing a configuration of a controller and a drive system of a vehicle according to a first embodiment.

In an internal combustion engine 10 mounted on a vehicle VC shown in FIG. 1, a throttle valve 14 is provided in an intake passage 12. The air taken in from the intake passage 12 flows into combustion chambers 18 of the cylinders #1 to #4 when an intake valve 16 is opened. Fuel is injected into the combustion chamber 18 of the internal combustion engine 10 by a fuel injection valve 20. In the combustion chamber 18, the air-fuel mixture is subjected to combustion by spark discharge of an ignition device 22, and the energy generated by the combustion is taken out as rotational energy of a crankshaft 24. The air-fuel mixture subjected to combustion is discharged to an exhaust passage 28 as exhaust air when an exhaust valve 26 opens. The exhaust passage 28 is provided with a catalyst 30 having an oxygen storage capacity.

The rotational power of the crankshaft 24 is transmitted to an intake side camshaft 42 through a variable valve timing device 40. The variable valve timing device 40 changes the relative rotational phase difference between the intake side camshaft 42 and the crankshaft 24.

Coupled to the crankshaft 24 is a crank rotor 50 provided with a plurality of (here, 34) tooth portions 52 indicating the rotation angle of the crankshaft 24. The crank rotor 50 is basically provided with tooth portions 52 at intervals of 10° CA, but has one missing tooth portion 54 where the interval between adjacent tooth portions 52 is 30° CA. This is to indicate the rotation angle that serves as a reference for the crankshaft 24.

The crankshaft 24 is mechanically connected to a carrier C of a planetary gear mechanism 60 forming the power split mechanism. The sun gear S of the planetary gear mechanism 60 is mechanically connected to the rotation shaft of a first motor generator 62, and the ring gear R of the planetary gear mechanism 60 is connected to the rotation shaft and the drive wheel 69 of a second motor generator 64. An AC voltage is applied to each terminal of the first motor generator 62 by an inverter 66, and an AC voltage is applied to each terminal of the second motor generator 64 by an inverter 68.

The controller 70 controls the internal combustion engine 10, and operates operation units of the internal combustion engine 10 such as the throttle valve 14, the fuel injection valve 20, the ignition device 22, the variable valve timing device 40, and the like to control the torque, exhaust component ratio, and the like, which are control amounts, of the internal combustion engine 10. Furthermore, the controller 70 controls the first motor generator 62, and operates the inverter 66 to control the torque and the rotational speed, which are the control amounts. Moreover, the controller 70 controls the second motor generator 64, and operates the inverter 68 to control the torque and the rotational speed, which are the control amounts. FIG. 1 shows operation signals MS1 to MS6 of the throttle valve 14, the fuel injection valve 20, the ignition device 22, the variable valve timing device 40, and the inverters 66 and 68.

When controlling the control amount, the controller 70 refers to the intake air amount Ga detected by the air flow meter 80, the detection value Af of the air-fuel ratio sensor 82 provided upstream of the catalyst 30, and the output signal Scr of the crank angle sensor 84 and the output signal Sca of the cam angle sensor 86 that output pulses for every angular interval between the tooth portions 52 provided every 10° CA excluding the missing tooth portion 54. Furthermore, the controller 70 refers to the coolant temperature THW which is the temperature of the cooling coolant of the internal combustion engine 10 detected by the coolant temperature sensor 88, and the accelerator pedal depression amount (accelerator operation amount ACCP) detected by the accelerator sensor 90.

The controller 70 includes a CPU 72, a ROM 74, a storage device 76 which is an electrically rewritable non-volatile memory, and a peripheral circuit 77, which can communicate with each other through a local network 78. The peripheral circuit 77 includes a circuit that generates a clock signal defining an internal operation, a power supply circuit, a reset circuit, and the like.

The controller 70 executes control of the control amount by the CPU 72 executing a program stored in the ROM 74.

Figure 2:
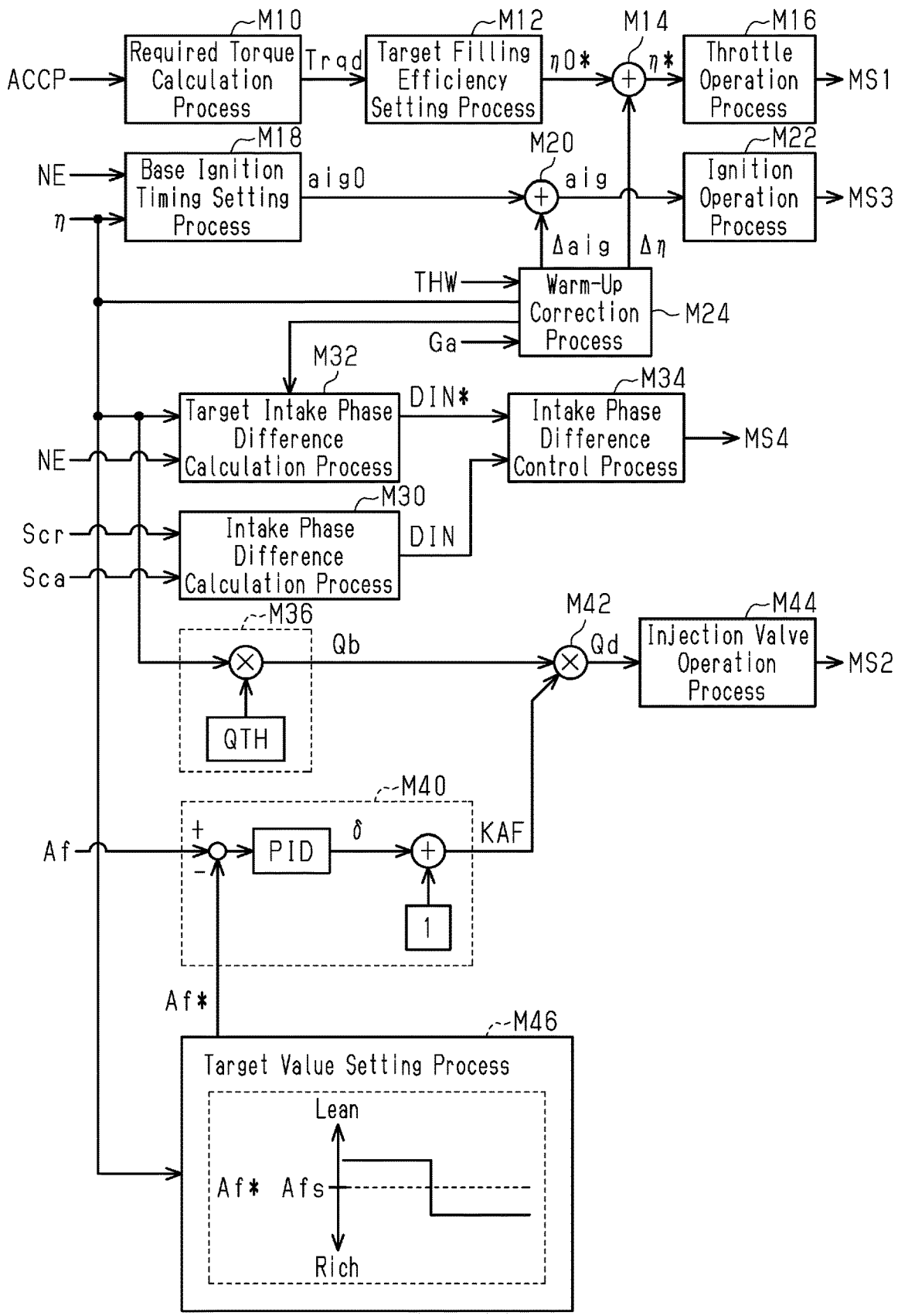
FIG. 2 is a block diagram showing a part of a process executed by the controller according to the first embodiment.

FIG. 2 shows a part of the process realized by the CPU 72 executing a program stored in the ROM 74.

A required torque calculation process M10 is a process of calculating the required torque Trqd for the internal combustion engine 10 to a larger value when the accelerator operation amount ACCP is large than when it is small. A target filling efficiency setting process M12 is a process of setting a target filling efficiency η0* required for setting the torque of the internal combustion engine 10 to the required torque Trqd. A target filling efficiency correction process M14 is a process of calculating a target filling efficiency $\eta^*$ by adding the filling efficiency correction amount $\Delta\eta$ to the target filling efficiency $\eta 0^*$. A throttle operation process M16 is a process of outputting the operation signal MS1 to the throttle valve 14 so as to control the opening degree of the throttle valve 14 to a larger value when the target filling efficiency $\eta^*$ is large than when it is small.

A base ignition timing setting process M18 is a process of setting the base ignition timing aig0 which is the base value of the ignition timing based on the rotational speed NE and the filling efficiency $\eta$ that define the operating point of the internal combustion engine 10. The rotational speed NE is calculated by the CPU 72 based on the output signal Scr. Further, the filling efficiency $\eta$ is calculated by the CPU 72 based on the rotational speed NE and the intake air amount Ga. An ignition timing correction process M20 is a process of calculating the ignition timing aig by adding the ignition timing correction amount $\Delta$aig to the base ignition timing aig0. An ignition operation process M22 is a process of outputting an operation signal MS3 to the ignition device 22 so that the timing of spark discharge by the ignition device 22 is the ignition timing aig.

A warm-up correction process M24 includes a process of calculating the ignition timing correction amount $\Delta$aig to a value for retarding the ignition timing aig and inputting it to the ignition timing correction process M20 when an execution request for the warm-up process of the catalyst 30 is made. The warm-up correction process M24 includes a process of calculating the filling efficiency correction amount $\Delta\eta$ to a value larger than zero and inputting it to the target filling efficiency correction process M14 when an execution request for the warm-up process is made. When the warm-up process is not executed, the ignition timing correction amount $\Delta$aig and the filling efficiency correction amount $\Delta\eta$ are set to zero. Specifically, the warm-up correction process M24 sets an efficiency reduction amount vef so as to reduce the efficiency at which the combustion energy of the air-fuel mixture in the combustion chamber 18 of the internal combustion engine 10 is converted into torque by the warm-up process, and sets the ignition timing correction amount $\Delta$aig to an amount on the retard side based thereon. The filling efficiency correction amount $\Delta\eta$ is for increasing the air amount to satisfy the required torque Trqd when the efficiency reduction amount vef is not zero. In the present embodiment, the execution request for the warm-up process is made when a logical product of the fact that the coolant temperature THW is lower than or equal to a predetermined temperature and the integrated value from the start of the intake air amount Ga is less than or equal to a predetermined value is true.

An intake phase difference calculation process M30 is a process of calculating an intake phase difference DIN which is a phase difference of a rotation angle of the intake side camshaft 42 with respect to the rotation angle of the crankshaft 24 based on the output signal Scr of the crank angle sensor 84 and the output signal Sca of the cam angle sensor 86. A target intake phase difference calculation process M32 is basically a process of variably setting a target intake phase difference DIN* based on an operating point of the internal combustion engine 10. In the present embodiment, the operating point is defined by the rotational speed NE and the filling efficiency $\eta$. In addition, a target intake phase difference calculation process M32 includes a process that changes the actual target intake phase difference DIN* with respect to the target intake phase difference DIN* corresponding to the operating point based on the correction instruction from the warm-up correction process M24 when the warm-up process is executed. Specifically, the target intake phase difference calculation process M32 includes a process that changes the internal EGR amount by changing an overlapping period (overlap amount RO) between the valve opening period of the intake valve 16 and the valve opening period of the exhaust valve 26 based on the correction instruction from the warm-up correction process M24 when the warm-up process is executed.

An intake phase difference control process M34 is a process of outputting an operation signal MS4 to the variable valve timing device 40 to operate the variable valve timing device 40 so as to control the intake phase difference DIN to the target intake phase difference DIN*.

A base injection amount calculation process M36 is a process of calculating a base injection amount Qb which is a base value of the fuel amount for making the air-fuel ratio of the air-fuel mixture in the combustion chamber 18 to the target air-fuel ratio based on a filling efficiency $\eta$. Specifically, when the filling efficiency $\eta$ is expressed as a percentage, for example, the base injection amount calculation process M36 may be a process of calculating the base injection amount Qb by multiplying the filling efficiency $\eta$ to the fuel amount QTH per 1% of the filling efficiency $\eta$ for making the air-fuel ratio to the target air-fuel ratio. The base injection amount Qb is a fuel amount calculated to control the air-fuel ratio to the target air-fuel ratio based on the amount of air filled in the combustion chamber 18. In the present embodiment, a theoretical air-fuel ratio is illustrated as a target air-fuel ratio.

A feedback process M40 is a process of calculating a feedback correction coefficient KAF obtained by adding "1" to the correction ratio $\delta$ of the base injection amount Qb serving as a feedback operation amount which is an operation amount for feedback controlling the detection value Af to the target value Af*, and outputting the same. Specifically, the feedback process M40 sets a sum of each output value of a proportional element and a differentiation element, having the difference between the detection value Af and the target value Af* as the input, and an output value of an integral element that holds and outputs an integrated value of a value corresponding to the difference as a correction ratio $\delta$.

A required injection amount calculation process M42 is a process of calculating a required injection amount Qd by multiplying the base injection amount Qb by the feedback correction coefficient KAF.

An injection valve operation process M44 is a process of outputting an operation signal MS2 to the fuel injection valve 20 so as to inject fuel corresponding to the required injection amount Qd within one combustion cycle from the fuel injection valve 20.

A target value setting process M46 is a process of setting the target value Af*. The target value setting process M46 includes a process of having, during the execution of the warm-up process, the target value Af* leaner than a stoichiometric point Afs corresponding to the theoretical air-fuel ratio in the first half of the warm-up process and having the target value Af* richer than the stoichiometric point Afs in the second half of the warm-up process in response to a command from the warm-up correction process M24. This is a setting considering that it is difficult to purify the unburned fuel before the catalyst 30 is warmed up.

The controller 70 executes a process that determines the presence of misfire at the time of the operation of the internal combustion engine 10. At this time, in view of the fact that the control is greatly changed depending on whether or not the warm-up process is executed, the presence of misfire is determined by different processes.

Figure 3:
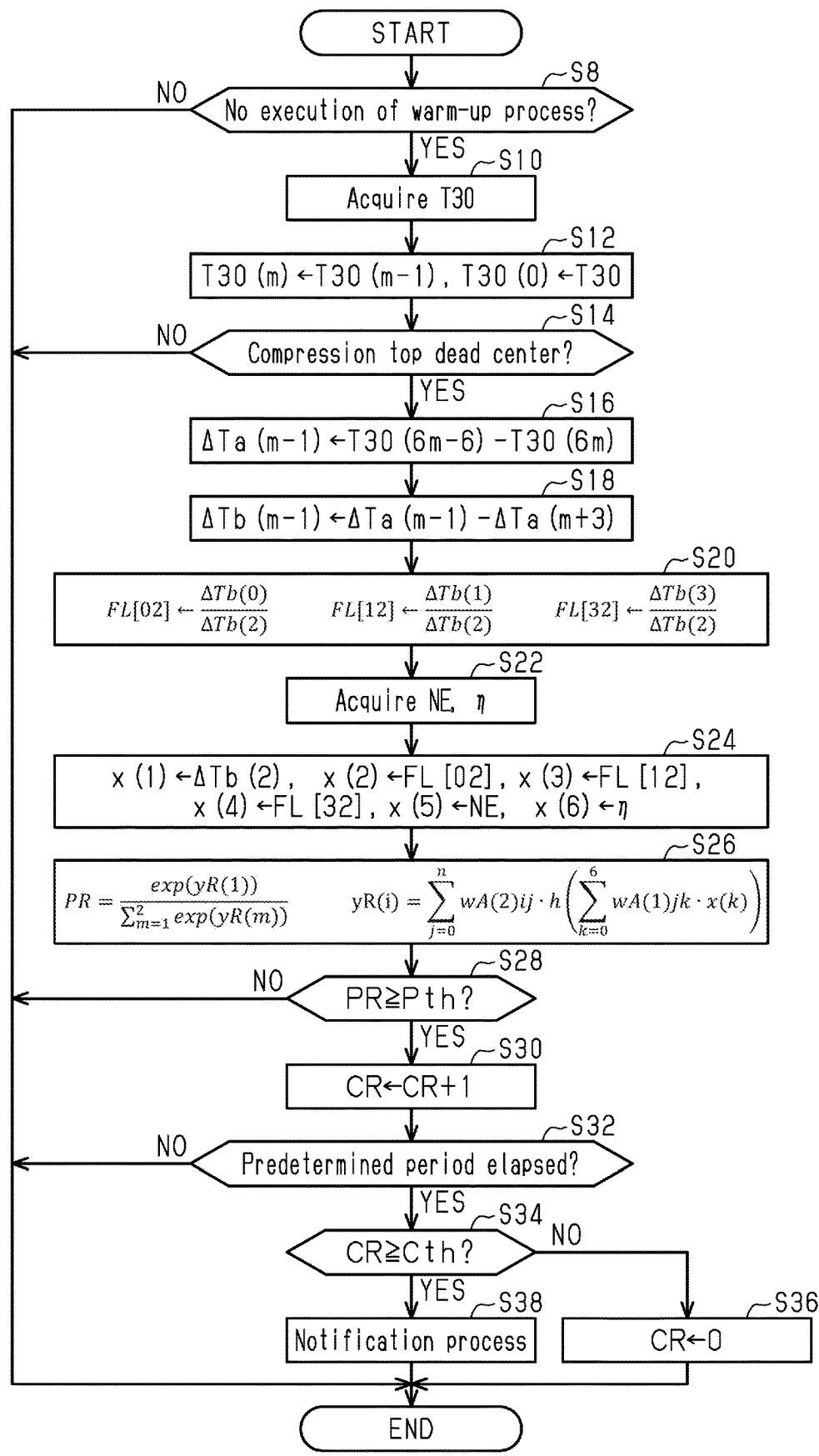
FIG. 3 is a flowchart showing a procedure of a process executed by the controller according to the first embodiment.

FIG. 3 shows a procedure of a process related to misfire detection. The process shown in FIG. 3 is realized by the CPU 72 repeatedly executing the misfire program 74a stored in the ROM 74 at, for example, a predetermined cycle. Hereinafter, the step number of each process is represented by the number with "S" at the head.

In the series of processes shown in FIG. 3, the CPU 72 first determines whether or not the warm-up process is executed (S8). When determining that the warm-up process is not being executed (S8: YES), the CPU 72 acquires the short rotation time T30 (S10). The short rotation time T30 is calculated by measuring the time required for the crankshaft 24 to rotate 30° CA based on the output signal Scr of the crank angle sensor 84 by the CPU 72. Next, the CPU 72 sets the latest short rotation time T30 acquired in the process of S10 as the short rotation time T30(0), and the variable "m" of the short rotation time T30(m) is set to a larger value as the past value increases (S12). That is, as "m=1, 2, 3, ... ", the short rotation time T30(m−1) immediately before the process of S12 is performed is defined as the short rotation time T30(m). Thus, for example, the short rotation time T30 acquired by the process of S10 when the process of FIG. 3 was executed last time becomes the short rotation time T30(1).

Next, the CPU 72 determines whether or not the short rotation time T30 acquired in the process of S10 is a time required for the rotation of an angular interval from 30° CA before the compression top dead center to the compression top dead center of any of the cylinders #1 to #4 (S14). When determining as the time required for the rotation of the angular interval up to the compression top dead center (S14: YES), the CPU 72 first calculates the value of the rotation waveform variable to be the input for the determination process that determines presence of misfire to determine the presence of misfire of a cylinder that has reached the compression top dead center 360° CA earlier.

That is, the CPU 72 first calculates the difference between the values separated by 180° of the short rotation time T30 related to the angular interval from 30° CA before the compression top dead center to the compression top dead center as the inter-cylinder variable ΔTa (S16). Specifically, the CPU 72 sets the inter-cylinder variable ΔTa(m−1) to "T30(6m−6)−T30(6m)", where "m=1, 2, 3, ... ".

Figure 4:
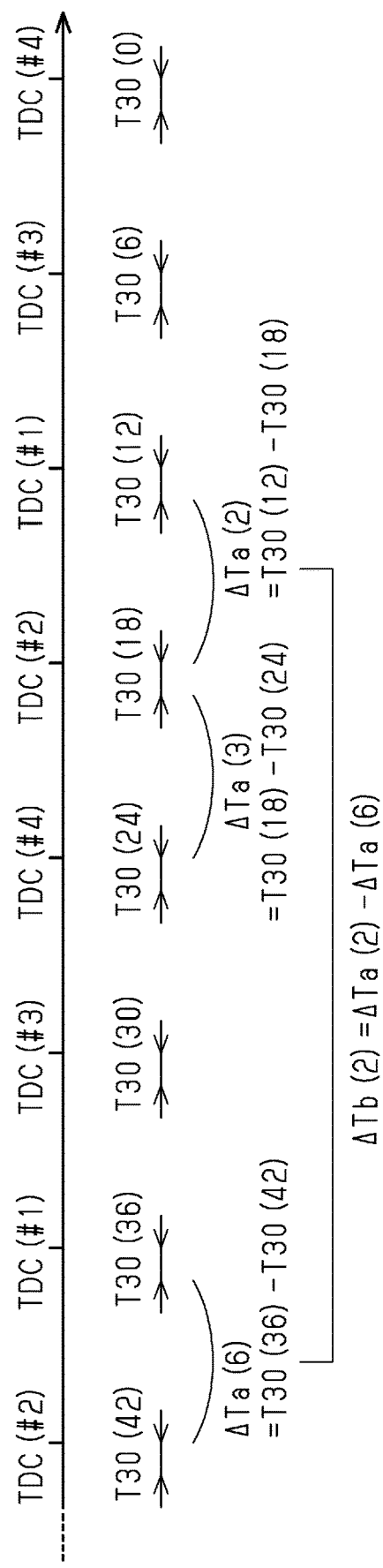
FIG. 4 is a time chart showing input variables of mapping according to the first embodiment.

FIG. 4 illustrates the inter-cylinder variable ΔTa. In the present embodiment, the compression top dead center appears in the order of cylinder #1, cylinder #3, cylinder #4, and cylinder #2, and the combustion stroke is illustrated in that order. FIG. 4 shows an example in which the detection target of the presence of misfire is cylinder #1 by acquiring the short rotation time T30(0) of the angular interval from 30° CA before compression top dead center to the compression top dead center of cylinder #4 in the process of S10. In this case, the inter-cylinder variable ΔTa(0) is a difference between the short rotation times T30 corresponding to each of the compression top dead center of cylinder #4 and the compression top dead center of cylinder #3 that reached the compression top dead center one before. In FIG. 4, the inter-cylinder variable ΔTa(2) is described as being a difference between the short rotation time T30(12) corresponding to the compression top dead center of cylinder #1 to be detected for misfire and the short rotation time T30(18) corresponding to the compression top dead center of cylinder #2.

Returning to FIG. 3, the CPU 72 calculates the inter-cylinder variable ΔTb, which is the difference between values separated by 720° CA of the inter-cylinder variables ΔTa(0), ΔTa(1), ΔTa(2), ... (S18). Specifically, the CPU 72 sets the inter-cylinder variable ΔTb(m−1) to "ΔTa(m−1)−ΔTa(m+)" where "m=1, 2, 3, ... ".

FIG. 4 illustrates the inter-cylinder variable ΔTb. FIG. 4 shows that the inter-cylinder variable ΔTb(2) is "ΔTa(2)−Ta(6)".

Returning to FIG. 3, the CPU 72 calculates the fluctuation pattern variable FL indicating the relative relationship between the inter-cylinder variable ΔTb corresponding to the cylinder to be detected for misfire and the inter-cylinder variable ΔTb corresponding to the other cylinders (S20). In the present embodiment, the fluctuation pattern variables FL[02], FL[12], FL[32] are calculated.

Here, the fluctuation pattern variable FL[02] is defined by "ΔTb(0)/ΔTb(2)". That is, using the example of FIG. 4, the fluctuation pattern variable FL[02] is a value obtained by dividing an inter-cylinder variable ΔTb(0) corresponding to the cylinder #4 that reaches the compression top dead center after next time by the inter-cylinder variable ΔTb(2) corresponding to cylinder #1 to be detected for misfire. The fluctuation pattern variable FL[12] is defined by "ΔTb(1)/ΔTb(2)". That is, using the example of FIG. 4, the fluctuation pattern variable FL[12] is a value obtained by dividing an inter-cylinder variable ΔTb(1) corresponding to the cylinder #3 that reaches the compression top dead center next time by the inter-cylinder variable ΔTb(2) corresponding to cylinder #1 to be detected for misfire. The fluctuation pattern variable FL[32] is defined by "ΔTb(3)/ΔTb(2)". That is, using the example of FIG. 4, the fluctuation pattern variable FL[32] is a value obtained by dividing an inter-cylinder variable ΔTb(3) corresponding to the cylinder #2 that reached the compression top dead center one before by the inter-cylinder variable ΔTb(2) corresponding to cylinder #1 to be detected for misfire.

Next, the CPU 72 acquires the rotational speed NE and the filling efficiency η that define the operating point of the internal combustion engine 10 (S22).

Then, the CPU 72 substitutes the values of the rotation waveform variable acquired by the processes of S18, S20 and the value of the variable acquired by the process of S22 to the input variables x(1) to x(6) of the mapping that outputs the misfire variable PR that is a variable related to the probability that misfire has occurred in the cylinder to be detected (S24). That is, the CPU 72 substitutes the inter-cylinder variable ΔTb(2) to the input variable x(1), substitutes the fluctuation pattern variable FL[02] to the input variable x(2), substitutes the fluctuation pattern variable FL[12] to the input variable x(3), and substitutes the fluctuation pattern variable FL[32] to the input variable x(4). Furthermore, the CPU 72 substitutes the rotational speed NE tor the input variable x(5) and substitutes the filling efficiency η to the input variable x(6).

Next, the CPU 72 calculates the value of the misfire variable PR which is the output value of mapping by inputting the input variables x(1) to x(6) to the mapping defined by the post-warm-up mapping data 76a stored in the storage device 76 shown in FIG. 1 (S26).

In the present embodiment, this mapping is formed by a neural network including one intermediate layer. The neural network includes the input side coefficient wA(1)jk(j=0 to n, k=0 to 6) and the activation function h(x) serving as an input side nonlinear mapping that nonlinearly converts each of the output of the input side linear mapping which is the linear mapping defined by the input side coefficient wA(1)jk. In the present embodiment, ReLU is exemplified as the activation function h(x) Here, wA(1)j0 and the like are bias parameters, and the input variable x(0) is defined as "1".

Furthermore, the neural network includes the output side coefficient wA(2)ij (i=1 to 2, j32 0 to n) and the softmax function that outputs the misfire variable PR using each of the prototype variables yR(1) and yR(2) or outputs of the output side linear mapping which is a linear mapping defined by the output side coefficient wA(2)ij as inputs. Thus, in the present embodiment, the misfire variable PR is obtained by quantifying likelihood that misfire actually occurred as a continuous value within a predetermined region that is larger than "0" and smaller than "1".

Next, the CPU 72 determines whether or not the value of the misfire variable PR is greater than or equal to the determination value Pth (S28). When determining that the value is greater than or equal to the determination value Pth (S28: YES), the CPU 72 increments the counter CR (S30). Then, the CPU 72 determines whether or not a predetermined period has elapsed from a time point the process of S28 was first executed or a time point the process of S36, to be described later, was performed (S32). Here, the predetermined period is longer than the period of one combustion cycle. The predetermined period may have a length of 10 times or more of one combustion cycle.

When determining that the predetermined period has elapsed (S32: YES), the CPU 72 determines whether or not the counter CR is greater than or equal to the threshold value Cth (S34). This process is a process that determines whether or not misfire has occurred at a frequency exceeding the allowable range. When determining that the value is less than the threshold value Cth (S34: NO), the CPU 72 initializes the counter CR (S36). In contrast, when determining that it is greater than or equal to the threshold value Cth (S34: YES), the CPU 72 executes a notification process that operates the warning lamp 100 shown in FIG. 1 to urge the user to handle the abnormality (S38).

When the processes of S36 and S38 are completed or when a negative determination is made in the processes of S8, S14, S28, S32, the CPU 72 once terminates the series of processes shown in FIG. 3.

Figure 5:
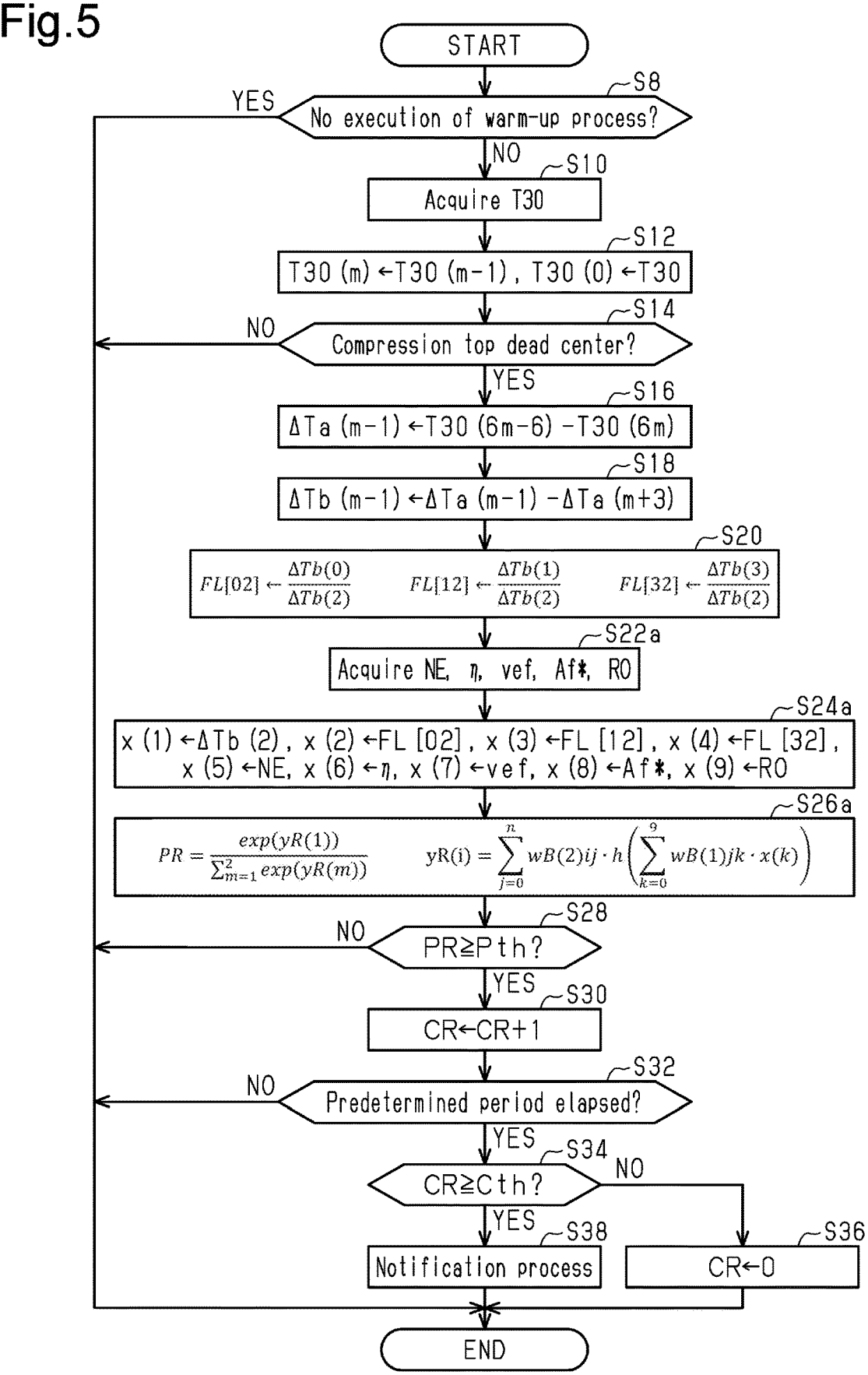
FIG. 5 is a flowchart showing a procedure of a process executed by the controller according to the first embodiment.

FIG. 5 shows a procedure of a process related to the detection of misfire. The process shown in FIG. 5 is realized by the CPU 72 repeatedly executing the misfire program 74*a* stored in the ROM 74 at, for example, a predetermined cycle. In FIG. 5, processes corresponding to the processes shown in FIG. 3 are denoted with the same step numbers for the sake of convenience.

In the series of processes shown in FIG. 5, the CPU 72 proceeds to the process of S10 when determining that the warm-up process is being executed (S8: NO), and thereafter, acquires an efficiency reduction amount vef, a target value Af*, and an overlap amount RO in addition to the rotational speed NE and the filling efficiency η, when the process of S20 is completed (S22*a*).

Next, the CPU 72 substitutes the value of the variable acquired by the processes of S18, S20, S22*a* to the input variables x(1) to x(6) (S24*a*). That is, the CPU 72 substitutes the same variables as the process of S24 to the input variables x(1) to x(6), and also substitutes the efficiency reduction amount vef to the input variable x(7), substitutes the target value Af* to the input variable x(8), and substitutes the overlap amount RO to the input variable x(9).

Next, the CPU 72 calculates the value of the misfire variable PR which is the output value of mapping by inputting the input variables x(1) to x(9) to the mapping defined by the warm-up mapping data 76*b* stored in the storage device 76 shown in FIG. 1 (S26*a*).

In the present embodiment, this mapping is formed by a neural network including one intermediate layer. The neural network includes the input side coefficient wB(1)jk(j=0 to n, k=0 to 9) and the activation function h(x) serving as an input side nonlinear mapping that nonlinearly converts each of the output of the input side linear mapping which is the linear mapping defined by the input side coefficient wB(1)jk. In the present embodiment, ReLU is exemplified as the activation function h(x). Here, wB(1)j0 and the like are bias parameters, and the input variable x(0) is defined as "1".

Furthermore, the neural network includes the output side coefficient wB(2)ij (i=1 to 2, j=0 to n) and the softmax function that outputs the misfire variable PR using each of the prototype variables yR(1) and yR(2) or outputs of the output side linear mapping which is a linear mapping defined by the output side coefficient wB(2)ij as inputs.

When the process of S26*a* is completed, the CPU 72 executes the processes after S28.

The post-warm-up mapping data 76*a* is generated, for example, in the following manner. That is, the internal combustion engine 10 is operated with the dynamometer connected to the crankshaft 24 on the test bench, and fuel injection is stopped at a timing selected randomly from the timings at which the fuel should be injected required in each of the cylinders #1 to #4 after the warmup of the internal combustion engine 10. In cylinders in which the fuel injection is stopped, the data with a value of misfire variable PR as "1" was used as teacher data, and in cylinders in which the fuel injection is not stopped, the data with a value of misfire variable PR as "0" is included in the teacher data. Then, the value of the misfire variable PR is calculated by the same processes as the processes of S24 and S26 using the rotation waveform variable for each time and the value of the variable acquired by the process of S22. The values of the input side coefficient wA(1)jk and the output side coefficient wA(2)ij are learned so as to reduce the difference between the value of the misfire variable PR calculated in such a way and the teacher data. Specifically, for example, the values of the input side coefficient wA(1)jk and the output side coefficient wB(1)ij may be learned so as to minimize the tolerance entropy.

In the warm-up mapping data 76*b*, the above processes may be changed to calculate the value of the misfire variable PR through the same processes as the processes of S24*a* and S26*a* at the time of warm-up, and the values of the input side coefficient wB(1)jk and output side coefficient wB(2)ij may be learned.

As described above, by using machine learning, the post-warm-up mapping data 76*a* and the warm-up mapping data 76*b* can be learned using the teacher data generated by operating the internal combustion engine 10 relatively freely while taking various operating points. Thus, compared with a case where map data is adapted for each operating point based on the detection of the behavior of the crankshaft 24 in the presence of misfire, the manufacturing steps can be reduced.

The operation and effect of the present embodiment will now be described.

The CPU 72 determines the presence of misfire by calculating the value of the misfire variable PR based on the rotation waveform variable. Here, the CPU 72 calculates the value of the misfire variable PR using the post-warm-up mapping data 76*a* when the warm-up process is not executed, and the CPU 72 calculates the value PR of the misfire variable PR using the warm-up mapping data 76*b* when the warm-up process is executed. At the time of the catalyst warm-up, the behavior of the crankshaft 24 is that differs from a case in which the warm-up process is not performed due to, for example, operating the internal combustion engine 10 by reducing the combustion efficiency.

Figure 6:
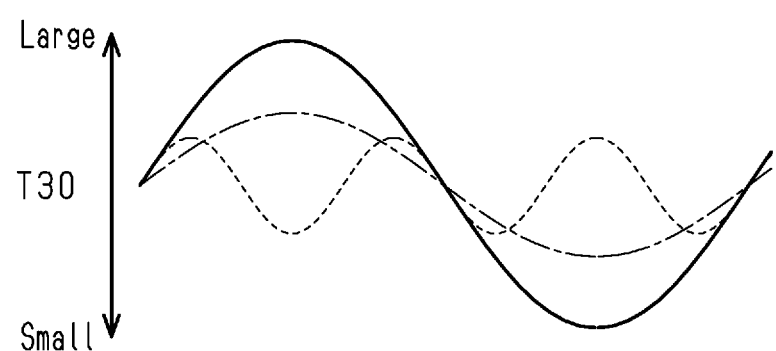
FIG. 6 is a time chart showing a rotational behavior waveform of a crankshaft according to the first embodiment.

In FIG. 6, the transition of the short rotation time T30 at the normal time is shown by a broken line, the transition of the micro rotation time T30 when the warm-up process is not performed when a misfire occurs is shown by a solid line, and the transition of the short rotation time T30 when the warm-up process is executed when a misfire occurs is shown by a chain dashed line. As shown in FIG. 5, in a case where the warm-up process is executed when a misfire has occurred, the fluctuation of the short rotation time T30 becomes smaller than when the warm-up process is not executed. Therefore, the difference between the fluctuation of the short rotation time T30 when the warm-up process is executed when misfire has not occurred and the fluctuation of the short rotation time T30 when the warm-up process is not executed when misfire has occurred becomes small. Thus, if the process is not changed according to the presence of the warm-up process, there is a possibility the accuracy in identification between the fluctuation of the short rotation time T30 when the warm-up process is executed when misfire has not occurred, and the fluctuation of the short rotation time T30 when the warm-up process is not executed when misfire has occurred may lower.

Therefore, in the present embodiment, the post-warm-up mapping data 76a and the warm-up mapping data 76b are set as different data. Here, if the same data is used regardless of whether or not the warm-up process is executed, a request to enlarge the dimension of the input variable or a request to increase the number of intermediate layers may arise, and the mapping structure tends to be complicated. In the present embodiment, the mapping can be simplified by using different mappings depending on whether or not the warm-up process is executed, and as a result, the calculation load can be reduced while calculating the value of the misfire variable PR with high accuracy.

The present embodiment described above further has the following operation effects.

(1) The rotational speed NE and the filling efficiency η serving as operating point variables that define the operating point of the internal combustion engine 10 are used as inputs of mapping. The operation amount of the operation unit of the internal combustion engine 10 such as the fuel injection valve 20 or the ignition device 22 tends to be determined based on the operating point of the internal combustion engine 10. Therefore, the operating point variable is a variable including information related to the operation amount of each operation unit. Therefore, by using the operating point variable as an input of mapping, the value of the misfire variable PR can be calculated based on the information related to the operation amount of each operation unit, and as a result, the value of the misfire variable PR can be calculated with higher accuracy by reflecting change in the rotational behavior of the crankshaft 24 by the operation amount.

Furthermore, by using the operating point variable as an input variable, the value of the misfire variable PR is calculated by the join operation by the input side coefficients wA(1)jk, wB(1)jk, which are parameters learned by machine learning, of the rotation waveform variable and the operating point variable. Thus, there is no need to adapt the adaptation value for each operating point variable. In contrast, for example, when the inter-cylinder variable ΔTb and the determination value are compared, there is a need to adapt the determination value for each operating point variable. This increases manufacturing steps.

(2) The efficiency reduction amount vef is included in the input variable. Thus, more detailed information on the effect on the rotational behavior of the crankshaft 24 can be obtained as compared to the case where the binary variable indicating whether or not the warm-up process is executed is used as an input variable, whereby the value of the misfire variable PR is more easily calculated with higher accuracy.

(3) The overlap amount RO is included in the input variable. The internal EGR amount differs depending on the overlap amount RO, the combustion state of the air-fuel mixture in the combustion chamber 18 changes depending on the internal EGR amount, and consequently the rotational behavior of the crankshaft 24 changes. Therefore, in the present embodiment, the value of the misfire variable PR reflecting the rotational behavior of the crankshaft 24 corresponding to the overlap amount RO can be calculated by including the overlap amount RO in the input to the mapping.

(4) The target value Af* is included in the input variable. When the air-fuel ratio is changed, the combustion state of the air-fuel mixture in the combustion chamber 18 changes, and consequently the rotational behavior of the crankshaft 24 changes. Therefore, in the present embodiment, the value of the misfire variable PR reflecting the rotational behavior of the crankshaft 24 corresponding to the air-fuel ratio can be calculated by including the target value Af* in the input to the mapping.

(5) The rotation waveform variable to become the input variable x is generated by selectively using a value near the compression top dead center in the short rotation time T30. The difference that occurs the most in the presence of misfire is the value near the compression top dead center in the short rotation time T30. Therefore, the information necessary for determining the presence of misfire can be acquired as much as possible while suppressing the dimension of the input variable x from increasing by selectively using the value near the compression top dead center in the short rotation time T30.

(6) The inter-cylinder variable ΔTb(2) is included in the rotation waveform variable. The inter-cylinder variable ΔTb(2) is obtained by quantifying, in advance, one-dimensionally the difference between the short rotation times T30 corresponding to the compression top dead center between the cylinder to be detected for misfire and the cylinder adjacent thereto. Therefore, the information necessary for determining the presence of misfire can be efficiently acquired with a variable having a small number of dimensions.

(7) The rotation waveform variable includes not only the inter-cylinder variable ΔTb(2) but also the fluctuation pattern variable FL. Since vibration from the road surface and the like are superimposed on the crankshaft 24, an erroneous determination may occur when the rotation waveform variable is only the inter-cylinder variable ΔTb(2). In the present embodiment, the value of the misfire variable PR is calculated using the fluctuation pattern variable FL in addition to the inter-cylinder variable ΔTb(2), whereby the value of the misfire variable PR can be set to a value indicating the degree (probability) of likelihood of misfire more accurately compared with a case in which the value of the misfire variable is calculated only from the inter-cylinder variable ΔTb(2).

In addition, in the present embodiment, the value of the misfire variable PR is calculated by the join operation of the inter-cylinder variable ΔTb(2) and the fluctuation pattern variable FL by the input side coefficients wA(1)jk, wB(1)jk, which are parameters learned by machine learning. Therefore, compared to a case where the presence of misfire is determined based on the comparison between the inter-cylinder variable ΔTb(2) and the determination value and the comparison between the fluctuation pattern variable FL and the determination value, the presence of misfire can be determined based on a more detailed relationship of the inter-cylinder variable ΔTb(2) and the fluctuation pattern variable FL and the presence of misfire.

Second Embodiment

A second embodiment will be described below with reference to the drawings, focusing on the differences from the first embodiment.

Figure 7:
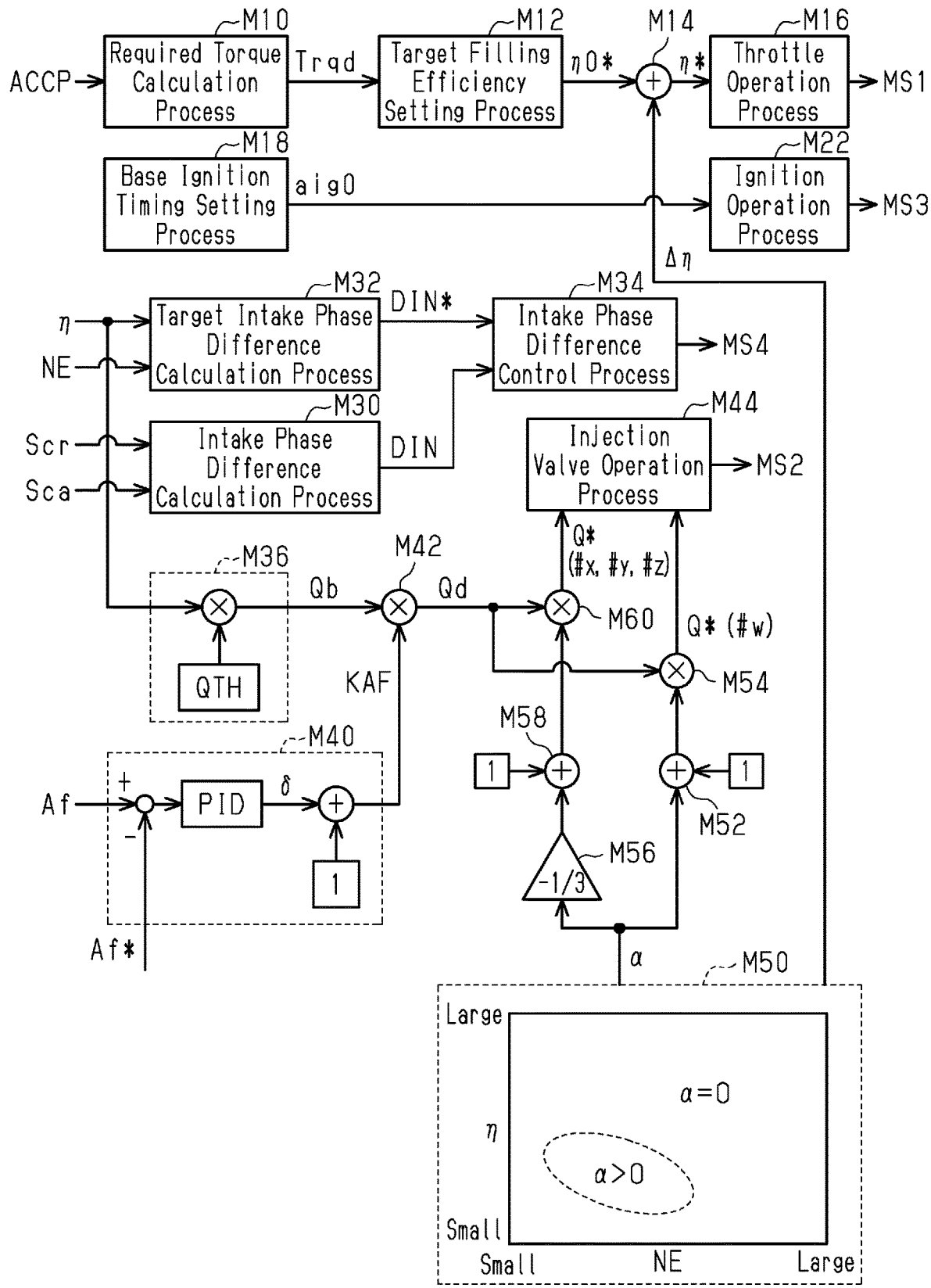
FIG. 7 is a block diagram showing a part of a process executed by a controller according to a second embodiment.

FIG. 7 shows a part of a process executed by the controller 70 according to the present embodiment. The process shown in FIG. 7 is realized by the CPU 72 executing the program stored in the ROM 74. In FIG. 7, processes corresponding to the processes shown in FIG. 2 are denoted with the same reference numerals for the sake of convenience.

An amplitude value variable output process M50 is a process of calculating an amplitude value variable α of dither control that differs the air-fuel ratio of the air-fuel mixture combusted among the cylinders and outputting the same while setting the air-fuel ratio when the air-fuel mixture in each of the cylinders #1 to #4, which is the air-fuel mixture combusted in a period the crankshaft 24 rotates twice, is collected into one as the target value Af*. Here, in the dither control according to the present embodiment, one of the first cylinder #1 to the fourth cylinder #4 is a rich combustion cylinder in which the air-fuel ratio of the air-fuel mixture is richer than the theoretical air-fuel ratio, and the remaining three cylinders are lean combustion cylinders in which the air-fuel ratio of the air-fuel mixture is leaner than the theoretical air-fuel ratio. Then, the injection amount in the rich combustion cylinder is set to "1+α" times the required injection amount Qd, and the injection amount in the lean combustion cylinder is set to "1−(α/3)" times the required injection amount Qd. Thus, if the amount of air filled in each of the cylinders #1 to #4 in one combustion cycle is the same, the following two values (A) and (B) are equal to each other.

Value (A): Sum (here, "α" itself) for the number of appearances (here, once) in the combustion stroke of the rich combustion cylinder in the period in which the crankshaft rotates twice of the increase ratio (here, "α") with respect to the required injection amount Qd in the rich combustion cylinder.

Value (B): Sum (here, "α" itself) for the number of appearances (here, three times) in the combustion stroke of the lean combustion cylinder in the period in which the crankshaft rotates twice of the decrease ratio (here, "α/3") with respect to the required injection amount Qd in the lean combustion cylinder.

If the amount of air filled in each of the cylinders #1 to #4 is the same in one combustion cycle by making the value (A) and the value (B) equal to each other, the air-fuel ratio when the air-fuel mixture combusted in each of the cylinders #1 to #4 of the internal combustion engine 10 is collected into one can be made the same as the target value Af*.

At the time of the warm-up process, the amplitude value variable α is set to a value larger than zero by the amplitude value variable output process M50 Specifically, the amplitude value variable output process M50 includes a process of variably setting the amplitude value variable α based on the rotational speed NE and the filling efficiency η. Specifically, the amplitude value variable α is map calculated by the CPU 72 in a state in which the map data having the rotational speed NE and the filling efficiency η as input variables and the amplitude value variable α as an output variable is stored in the ROM 74 in advance. FIG. 7 shows that the amplitude value variable α is zero in a region where the rotational speed NE and the filling efficiency η are large. This is because a fact that, in a high load region or the like, the energy flow rate of the exhaust gas flowing into the catalyst 30 increases even if the dither control is not performed is taken into consideration.

The map data is set data of a discrete value of the input variable and a value of the output variable corresponding to each value of the input variable. The map calculation may be, for example, a process of having the value of the output variable of the corresponding map data as a calculation result when the value of the input variable matches one of the values of the input variables of the map data, and having a value obtained by interpolation of the values of a plurality of output variables included in the map data as a calculation result when the value of the input variable does not match any of the values of the input variables of the map data.

A correction coefficient calculation process M52 is a process of calculating the correction coefficient of the required injection amount Qd for the rich combustion cylinder by adding the amplitude value variable α to "1". A dither correction process M54 is a process of calculating the injection amount command value Q* of the cylinder #w to be the rich combustion cylinder by multiplying the required injection amount Qd by the correction coefficient "1+α". Here, "w" is any one of "1" to "4".

A multiplication process M56 is a process of multiplying the amplitude value variable α by "−⅓", and a correction coefficient calculation process M58 is a process of calculating the correction coefficient of the required injection amount Qd for the lean combustion cylinder by adding the output value of the multiplication process M56 to "1". A dither correction process M60 is a process of calculating an injection amount command value Q* of the cylinders #x, #y, #z to be the lean combustion cylinders by multiplying the required injection amount Qd by the correction coefficient "1−(α/3)". Here, "x", "y", "z" are any one of "1" to "4", and "w", "x", "y", "z" differ from one another.

An injection valve operation process M44 outputs an operation signal MS2 to the fuel injection valve 20 of the cylinder #w to be the rich combustion cylinder based on the injection amount command value Q* output by the dither correction process M54, and sets the total amount of fuel to be injected from the fuel injection valve 20 as an amount corresponding to the injection amount command value Q*. Furthermore, the injection valve operation process M44 outputs an operation signal MS2 to the fuel injection valve 20 of the cylinders #x, #y, #z to be the lean combustion cylinder based on the injection amount command value Q* output by the dither correction process M60, and sets the total amount of fuel to be injected from the fuel injection valve 20 as an amount corresponding to the injection amount command value Q*.

Figure 8:
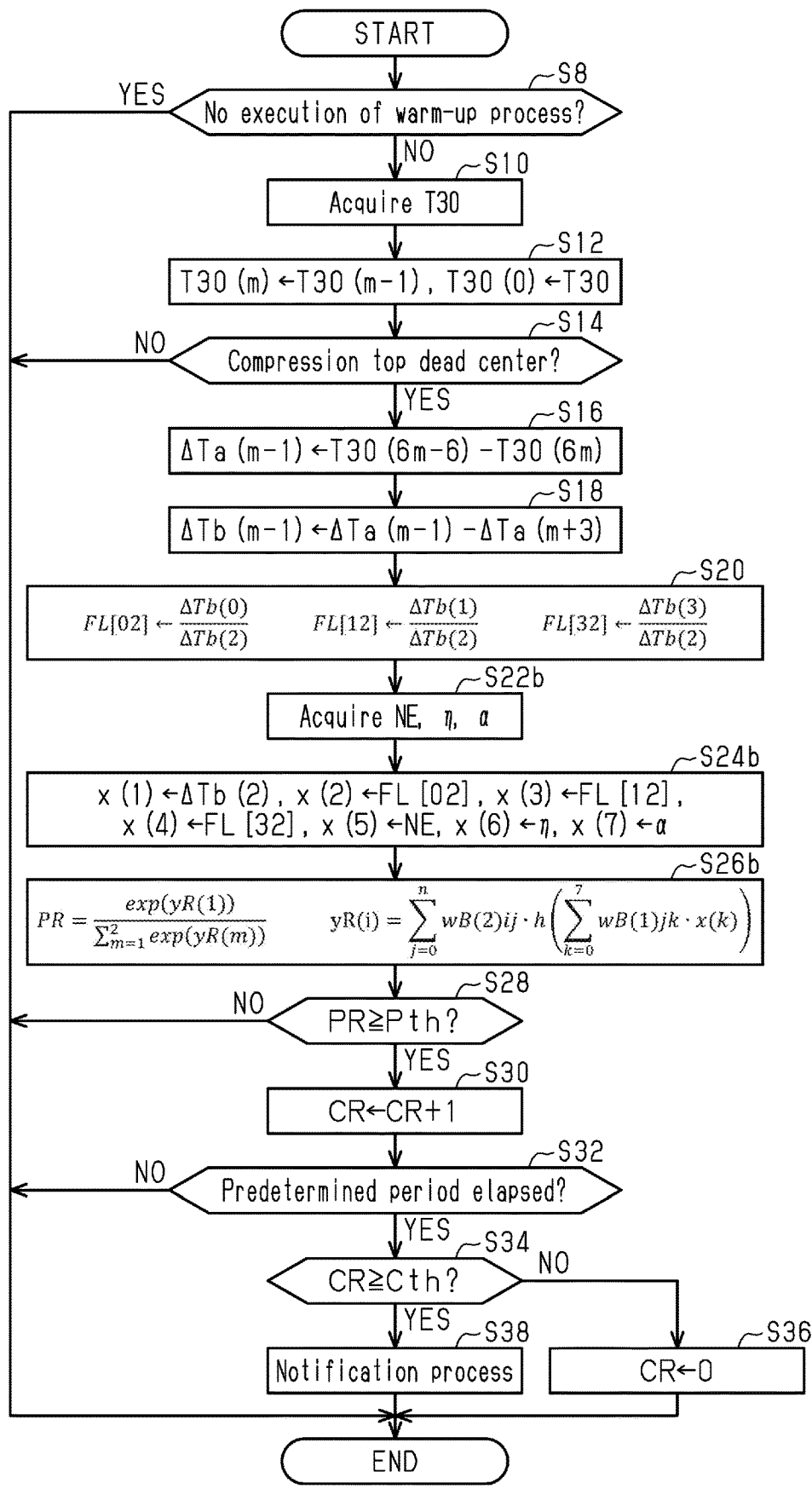
FIG. 8 is a flowchart showing a procedure of a process executed by the controller according to the second embodiment.

FIG. 8 shows a procedure of a process related to the detection of misfire. The process shown in FIG. 8 is realized by the CPU 72 repeatedly executing the misfire program 74a stored in the ROM 74 at, for example, a predetermined cycle. In FIG. 8, processes corresponding to the processes shown in FIG. 5 are denoted with the same step numbers for the sake of convenience.

In the series of processes shown in FIG. 8, when the process of S20 is completed, the CPU 72 acquires the amplitude value variable α in addition to the rotational speed NE and the filling efficiency η (S22b).

Next, the CPU 72 substitutes the value of the variable acquired by the processes of S18, S20, S22b to the input variable x (S24b). That is, the CPU 72 substitutes the value of the same variable as the process of S24 to the input variables x(1) to x(6), and substitutes the amplitude value variable α to the input variable x(7).

Next, the CPU 72 inputs the input variables x(1) to x(7) into the mapping defined by the warm-up mapping data 76b to calculate the value of the misfire variable PR which is the output value of the mapping (S26b).

In the present embodiment, this mapping is formed by a neural network including one intermediate layer. The above neural network includes the input side coefficient wB(1)jk (j=0 to n, k=0 to 7) and the activation function h(x) serving as the input side nonlinear mapping that nonlinearly converts each of the outputs of the input side linear mapping which is the linear mapping defined by the input side coefficient wB(1)jk. In the present embodiment, ReLU is exemplified as the activation function h(x). Here, wB(1)j0 and the like are bias parameters, and the input variable x(0) is defined as "1".

Furthermore, the neural network includes the output side coefficient wB(2)ij (i=1 to 2, j=0 to n) and the softmax function that outputs the misfire variable PR using each of the prototype variables yR(1) and yR(2) or outputs of the output side linear mapping which is a linear mapping defined by the output side coefficient wB(2)ij as inputs.

When the process of S26b is completed, the CPU 72 proceeds to the processes after S28.

Third Embodiment

A third embodiment will be described below with reference to the drawings, focusing on the differences from the first embodiment.

In the present embodiment, the calculation process of the misfire variable PR is performed outside the vehicle.

FIG. 9 shows a misfire detection system according to the present embodiment. In FIG. 9, members corresponding to the members shown in FIG. 1 are denoted with the same reference numerals for the sake of convenience.

The controller 70 in the vehicle VC shown in FIG. 9 includes a communication device 79. The communication device 79 is a device for communicating with a center 120 via the network 110 outside the vehicle VC.

The center 120 analyzes data transmitted from the plurality of vehicles VC. The center 120 includes a CPU 122, a ROM 124, a storage device 126, a peripheral circuit 127, and a communication device 129, which can communicate with each other through a local network 128.

FIG. 10 shows a procedure of a process related to the detection of misfire according to the present embodiment. The process shown in (a) in FIG. 10 is realized by the CPU 72 executing the misfire subprogram 74b stored in the ROM 74 shown in FIG. 9. Furthermore, the process shown in (b) in FIG. 10 is realized by the CPU 122 executing the misfire main program 124a stored in the ROM 124. In FIG. 10, processes corresponding to the processes shown in FIG. 5 are denoted with the same step numbers for the sake of convenience. Hereinafter, the process shown in FIG. 10 will be described along the time series of the misfire detection process.

That is, in the vehicle VC, when an affirmative determination is made in the process of S14 shown in (a) in FIG. 10, the CPU 72 acquires the short rotation times T30(0), T30(6), T30(12), T30(18), T30(24), T30(30), T30(36), T30(42), T30(48) (S40). These short rotation times T30 form a rotation waveform variable which is a variable including information regarding differences between short rotation times T30 at different angular intervals. In particular, the short rotation time T30 is a time required for rotation of an angular interval from 30° CA before the compression top dead center to the compression top dead center, and is a value corresponding to nine times of appearance timing of the compression top dead center. Therefore, the set data of the short rotation times T30 is a variable indicating information regarding differences between the short rotation times T30 corresponding to the compression top dead centers that differ from each other. The nine short rotation times T30 are all the micro-rotation times T30 used when calculating the inter-cylinder variable ΔTb(2) and the fluctuation pattern variables FL[02], FL[12], FL[32].

Next, the CPU 72 executes a process (S42) of obtaining the rotational speed NE and the filling efficiency η, and further executes a process (S42) of obtaining the efficiency reduction amount vef, the target value Af*, and the overlap amount RO at the time of the warm-up process (S42). Then, the CPU 72 operates the communication device 79 to transmit the data acquired in the processes of S40 and S42 and the information (execution presence information) on whether or not the data is at the time of executing the warm-up process to the center 120 together with the identification information (vehicle ID) of the vehicle VC (S44).

The CPU 122 of the center 120 receives the transmitted data as shown in (b) in FIG. 10 (S50). Then, the CPU 122 substitutes the value of the variable acquired by the process of S50 to the input variables x(1) to x(11) (S52). That is, the CPU 122 substitutes the short rotation time T30(0) to the input variable x(1), substitutes the short rotation time T30(6) to the input variable x(2), substitutes the short rotation time T30(12) to the input variable x(3), and substitutes the short rotation time T30(18) to the input variable x(4). The CPU 122 also substitutes the short rotation time T30(24) to the input variable x(5), substitutes the short rotation time T30 (30) for the input variable x(6), and substitutes the short rotation time T30(36) to the input variable x(7). Furthermore, the CPU 122 substitutes the short rotation time T30(42) to the input variable x(8), and substitutes the short rotation time T30(48) to the input variable x(9). Moreover, the CPU 122 substitutes the rotational speed NE to the input variable x(10) and substitutes the filling efficiency η to the input variable x(11).

Next, the CPU 72 determines whether or not the acquired data is obtained when the warm-up process is not being executed based on the execution presence information (S54). When determining that the acquired data is obtained when the process is not being executed (S54: YES), the CPU 122 inputs the mapping defined by the post-warm-up mapping data 126a stored in the storage device 126 shown in FIG. 9 to the input variables x(1) to x(11) to calculate the value of the misfire variable PR which is the output value of the mapping (S56).

In the present embodiment, the mapping is formed by a neural network in which the number of intermediate layers is "α", the activation functions h1 to hα of each intermediate layer are ReLU, and the activation function of the output layer is a softmax function. For example, the value of each node in the first intermediate layer is generated by inputting, to the activation function h1, the output when the input variables x(1) to x(11) are input to the linear mapping defined by the coefficient wA(1)ji(j=0 to n1, i=0 to 11). That is, if m=1, 2, . . . , α, the value of each node of the $m^{th}$ intermediate layer is generated by inputting, to the activation function hm, the output of the linear mapping defined by the coefficient wA(m). In FIG. 10, n1, n2, . . . , nα are the number of nodes in the first, second, . . . $\alpha^{th}$ intermediate layer. Here, wA(1)j0 and the like are bias parameters, and the input variable x(0) is defined as "1".

When determining that the acquired data is obtained at the time of the warm-up process (S54: NO), the CPU 122 substitutes the efficiency reduction amount vef to the input variable x(12), substitutes the target value Af* to the input variable x(13), and substitutes the overlap amount RO to the input variable x(14) (S58).

Next, the CPU 122 calculates the value of the misfire variable PR which is the output value of the mapping by inputting the input variables x(1) to x(14) into the mapping defined by the warm-up mapping data 126b stored in the storage device 126 shown in FIG. 9 (S60).

In the present embodiment, the mapping is formed by a neural network in which the number of intermediate layers is "α", the activation functions h1 to hα of each intermediate layer are ReLU, and the activation function of the output layer is a softmax function. For example, the value of each node in the first intermediate layer is generated by inputting, to the activation function h1, the output when the input variables x(1) to x(14) are input to the linear mapping defined by the coefficient wB(1)ji(j=0 to n1, i=0 to 14). That is, if m=1, 2, . . . , α, the value of each node of the $m^{th}$ intermediate layer is generated by inputting, to the activation function hm, the output of the linear mapping defined by the coefficient wB(m). Here, n1, n2, . . . , nα are the number of nodes in the first, second, . . . $\alpha^{th}$ intermediate layer. Here, wB(1)j0 and the like are bias parameters, and the input variable x(0) is defined as "1".

Next, the CPU 122 operates the communication device 129 to transmit a signal indicating the value of the misfire variable PR to the vehicle VC to which the data received by the process of S50 is transmitted (S62), and once terminates the series of processes shown in (b) in FIG. 10. As shown in (a) in FIG. 10, the CPU 72 receives the value of the misfire variable PR (S46), and executes the processes after S28.

Thus, in the present embodiment, the processes of S56 and S60 are executed in the center 120, so that the calculation load of the CPU 72 can be reduced.

Correspondence Relationship

Correspondence relationship between the matters in the embodiment described above and the matters described in the section "Summary of the Disclosure" is as follows. Hereinafter, the correspondence relationship is shown for every number of the aspect described in the section "Summary of the Disclosure".

[1] The misfire detection device corresponds to the controller 70. The execution device, that is, the processing circuitry corresponds to the CPU 72 and the ROM 74. The storage device corresponds to the storage device 76. The rotation waveform variable corresponds to the inter-cylinder variable ΔTb(2) and the fluctuation pattern variables FL[02], FL[12], FL[32]. The acquisition process corresponds to the processes of S18 to S22 and the processes of S18, S20, S22a, the determination process corresponds to the processes of S24 to S36 and the processes of S24a, S26a, S28 to S36, and the handling process corresponds to the process of S38. In FIG. 2, the warm-up process corresponds to the warm-up correction process M24, the ignition timing correction process M20, the ignition operation process M22, the target intake phase difference calculation process M32, the intake phase difference control process M34, the target value setting process M46, and the injection valve operation process M44. In FIG. 7, it corresponds to the amplitude value variable output process M50, the correction coefficient calculation process M52, the dither correction process M54, the multiplication process M56, the correction coefficient calculation process M58, the dither correction process M60 and the injection valve operation process M44 when the amplitude value variable α is not zero. The selecting process corresponds to the process of S8. The instantaneous speed variable corresponds to the short rotation time T30.

[2] The warm-up operation amount variable corresponds to the efficiency reduction amount vef, the target value Af*, the overlap amount RO, and the amplitude value variable α.

[3] The variable related to the retarded amount corresponds to the efficiency reduction amount vef.

[4] The valve specifying variable device corresponds to the variable valve timing device 40. The valve characteristic variable corresponds to the overlap amount RO.

[5] The air-fuel ratio variable corresponds to the target value Af*.

[6] The operating point variable corresponds to the rotational speed NE and the filling efficiency η.

[7] The first execution device corresponds to the CPU 72 and the ROM 74. The second execution device corresponds to the CPU 122 and the ROM 124. The rotation waveform variable corresponds to the short rotation times T30(0), T30(6), T30(12), . . . , T30(48). The acquisition process corresponds to the processes of S40 and S42, the vehicle-side transmitting process corresponds to the process of S44, and the vehicle-side receiving process corresponds to the process of S46. The external-side receiving process corresponds to the process of S50, the output value calculation process corresponds to the processes of S52 to S60, and the external-side transmitting process corresponds to the process of S62.

[8] The data analyzer corresponds to the center 120.

[9] The controller for the internal combustion engine corresponds to the controller 70 shown in FIG. 9.

[10] The computer corresponds to the CPU 72 and ROM 74, and the CPU 72, CPU 122, ROM 74, and ROM 124.

Other Embodiments

The present embodiment described above may be modified and implemented as described below. The present embodiment and the following modified examples can be implemented combined with each other within a scope not technically conflicting each other.

Valve Characteristic Variable

In the embodiment described above, the overlap amount RO is exemplified as the valve characteristic variable, but the present disclosure is not limited in such a manner. For example, the target intake phase difference DIN* or the intake phase difference DIN may be used. Furthermore, for example, the average value of the target intake phase difference DIN* and the intake phase difference DIN in the execution cycle of the process of S26 and the like may be used.

Air-fuel Ratio Variable

In the embodiment described above, the target value Af* is exemplified as the air-fuel ratio variable, but the present disclosure is not limited in such a manner. For example, an average value of the detection value Af in a predetermined period may be used.

Variable Related to Retarded Amount of Ignition Timing

In the embodiment described above, the efficiency reduction amount vef is used as a variable related to the retarded amount of the ignition timing, but the present disclosure is not limited in such a manner. For example, the average value of the ignition timing correction amount Δaig in the execution cycle of the process of S26 and the like may be used.

For example, when the efficiency reduction amount vef is constant over the execution period of the warm-up process, a variable related to the retarded amount of the ignition timing does not have to be included in the input to the mapping defined by the warm-up mapping data 76b and 126b. However, it is not essential that the efficiency reduction amount vef is not included in the input to the mapping when the efficiency reduction amount vef is constant over the execution period of the warm-up process. By including the efficiency reduction amount vef in the input to the mapping in such a case, for example, a plurality of specifications having different efficiency reduction amounts vef can be processed with a single warm-up mapping data 76b and 126b.

Inter-Cylinder Variable

The inter-cylinder variable ΔTb is not limited to the difference in short rotation time T30 corresponding to the compression top dead center between two cylinders in which compression top dead centers are consecutively reached separated by 720° CA. For example, the inter-cylinder variable ΔTb may be a difference in short rotation time T30 corresponding to compression top dead centers between cylinders that are separated by 360° CA in terms of the reaching timing of compression top dead centers separated by 720° CA. In this case, the inter-cylinder variable ΔTb(2) is "T30(12)−T30(24)−{(T30(36)−T30(48)}".

Furthermore, instead of the difference between the values separated by 720° CA of the difference between the short rotation times T30 corresponding to the compression top dead centers of two cylinders, the difference in short rotation time T30 may correspond to the compression top dead centers of the cylinder detected for misfire and another cylinder.

Furthermore, for example, the inter-cylinder variable may be a ratio between the short rotation times T30 corresponding to the compression top dead centers of the two cylinders.

The short rotation time in defining the inter-cylinder variable ΔTb is not limited to the time required for rotation of 30° CA, but may be, for example, the time required for rotation of 45° CA. At this time, the short rotation time may be a time required for rotation of an angular interval less than or equal to the reaching interval of the compression top dead center. The reaching interval of the compression top dead center means the interval between the rotation angles of the crankshaft 24 at which the compression top dead center is reached. An angular interval less than or equal to the reaching interval of the compression top dead center can also be referred to as a minute angular interval. The rotational speed of the crankshaft 24 at each of the plurality of minute angular intervals can be referred to as an instantaneous speed.

Furthermore, in the above description, instead of the short rotation time, an instantaneous rotational speed obtained by dividing the predetermined angular interval by the time required for the rotation of the predetermined angular interval may be used.

Fluctuation Pattern Variable

The definition of the fluctuation pattern variable is not limited to that exemplified in the embodiment described above. For example, the definition of the fluctuation pattern variable may be changed by changing the inter-cylinder variable ΔTb to the one exemplified in the section "Inter-cylinder variable".

Furthermore, it is not essential to define the fluctuation pattern variable as a ratio between the inter-cylinder variables ΔTb corresponding to the appearance timings of the different compression top dead centers, and a difference may be taken instead of the ratio. Even in this case, the value of the misfire variable PR can be calculated by reflecting the fact that the fluctuation pattern variable changes according to the operating point by including the operating point variable of the internal combustion engine 10 in the input.

Rotation Waveform Variable

In the process of S26, the rotation waveform variable is formed by the inter-cylinder variable ΔTb(2) and the fluctuation pattern variables FL[02], FL[12], FL[32]. However, this is not a limitation. For example, the fluctuation pattern variable forming the rotation waveform variable may be any one or two of the fluctuation pattern variables FL[02], FL[12], FL[32]. Furthermore, for example, four or more fluctuation pattern variables such as fluctuation pattern variables FL[02], FL[12], FL[32], FL[42], and the like may be included.

In the processes of S56 and S60, the rotation waveform variable is formed by the short rotation time T30 corresponding to each of the nine timings at which the appearance timing of the compression top dead center differs from each other, but the present disclosure is not limited in such a manner. For example, with the compression top dead center of a cylinder to be detected for misfire as the middle, the rotation waveform variable is formed by the short rotation time T30 in each of the sections obtained by dividing a zone of two or more times the angular interval in which the compression top dead center appears by an interval of 30° CA. In the above description, it is not essential to set the compression top dead center of the cylinder to be detected for misfire as the middle. Furthermore, the short rotation time here is not limited to the time required for rotation of an interval of 30° CA. Moreover, instead of the short rotation time, an instantaneous rotational speed obtained by dividing the predetermined angular interval by the time required for rotation of the predetermined angular interval may be used.

Operating Point Variable

The operating point variable is not limited to the rotational speed NE and the filling efficiency η. For example, the intake air amount Ga and the rotational speed NE may be used. Furthermore, for example, as described in the section "Internal combustion engine" below, when a compression ignition type internal combustion engine is used, the injection amount and the rotational speed NE may be used. It is not essential to use the operating point variable as an input of the mapping. For example, when applied to an internal combustion engine mounted on a series hybrid vehicle described in the section "Vehicle" below, when the internal combustion engine is operated only at a specific operating point, and the like, the value of the misfire variable PR can be calculated with high accuracy without including the operating point variable in the input variable.

External-side Transmitting Process

In the process of S62, the value of the misfire variable PR is transmitted, but the present disclosure is not limited in such a manner. For example, the values of the prototype variables yR(1) and yR(2) may be transmitted. Furthermore, for example, the center 120 may execute the processes of S28 to S36, and the determination result as to whether there is an abnormality may be transmitted.

Handling Process

In the embodiment described above, the occurrence of misfire is notified through visual information by operating the warning lamp 100. However, this is not a limitation. For example, the occurrence of misfire may be notified through auditory information by operating a speaker. Furthermore, for example, the controller 70 illustrated in FIG. 1 may include the communication device 79, and the communication device 79 may be operated to transmit a signal indicating that a misfire has occurred to the portable terminal of the user. This can be realized by installing an application program for executing the notification process in the portable terminal of the user.

The handling process is not limited to the notification process. For example, an operation process that operates an operation unit for controlling the combustion of the air-fuel mixture in the combustion chamber 18 of the internal combustion engine 10 in accordance with information indicating that a misfire has occurred may be employed. Specifically, for example, the ignition timing of a cylinder in which misfire has occurred may be advanced with the operation unit as the ignition device 22. Furthermore, for example, the fuel injection amount of the cylinder in which misfire has occurred may be increased with the operation unit as the fuel injection valve 20.

Input to Mapping

The input to the neural network, the input to the regression equation described in the section "Algorithm of machine learning" below, and the like are not limited to those in which each dimension is formed by a single physical quantity or fluctuation pattern variable FL. For example, with respect to some of the plurality of types of physical quantities and fluctuation pattern variables FL used as input to the mapping in the embodiment described above and the like, instead of having them as direct input to the neural network and the regression equation, some principal components obtained by their principal component analysis may be used as the direct input to the neural network and the regression equation. When the principal component is an input of the neural network and the regression equation, it is not essential that only a part of the input to the neural network and the regression equation is the principal component, and the entire input may be the principal component. When the principal component is an input to the mapping, the post-warm-up mapping data 76a and 126a and the warm-up mapping data 76b and 126b include data defining a mapping that determines the principle component.

Mapping Data

The mapping data that defines the mapping used for the calculation executed in the vehicle may be the post-warm-up mapping data 126a and the warm-up mapping data 126b.

The mapping data that defines the mapping used for the calculation executed in the center 120 may be the post-warm-up mapping data 76a and the warm-up mapping data 76b.

For example, according to the description of FIG. 10, the number of intermediate layers in the neural network is expressed to be more than two layers. However, this is not a limitation.

In the embodiment described above, the activation functions h, h1, h2, . . . hα are ReLU and the activation function of the output is a softmax function, but the present disclosure is not limited in such a manner. For example, the activation functions h, h1, h2, . . . hα may be hyperbolic tangents. For example, the activation functions h, h1, h2, . . . hα may be logistic sigmoid functions.

For example, the activation function of the output may be a logistic sigmoid function. In this case, for example, the number of nodes in the output layer may be one and the output variable may be the misfire variable PR. In that case, the presence or absence of an abnormality can be determined by determining as abnormal when the value of the output variable is greater than or equal to a predetermined value.

Algorithm of Machine Learning

The algorithm of machine learning is not limited to using a neural network. For example, a regression equation may be used. This corresponds to the neural network not including the intermediate layer. Furthermore, for example, a support vector machine may be used. In this case, the value of the output itself has no meaning, and whether or not misfire has occurred is expressed according to whether or not the value is positive. In other words, it is different from when the value of the misfire variable has a value of 3 or more, and those values represent the probability of misfire.

Learning Step

In the embodiment described above, learning is performed in a situation where misfire occurs randomly, but the present disclosure is not limited in such a manner. For example, the learning may be executed in a situation where misfire occurs continuously in a specific cylinder. However, in this case, the inter-cylinder variable ΔTb used for the inter-cylinder variable and the fluctuation pattern variable, which become the input to the mapping, may be the difference between the short rotation times T30 corresponding to the compression top dead centers of the cylinder detected for misfire and other cylinders, as described in the section "Inter-cylinder variable".

Data Analyzer

The process of (b) in FIG. 10 may be executed by, for example, a portable terminal possessed by the user. This can be realized by installing an application program for executing the process of (b) in FIG. 10 in the portable terminal. At this time, for example, the vehicle ID transmitting/receiving process may be deleted by setting the effective distance of data transmission in the process of S44 to about the length of the vehicle, and the like.

Execution Device

The execution device is not limited to a device including the CPU 72 (122) and the ROM 74 (124) and executing the software process. For example, a dedicated hardware circuit e.g., ASIC, etc.) for processing at least part of the software process executed in the embodiment described above may be arranged. In other words, the execution device merely needs to have any of the configurations of (a) to (c) below. (a) A processing device that executes all the above processes in accordance with a program, and a program storage device such as a ROM that stores the program are provided. (b) A processing device and a program storage device that execute part of the above processes according to a program, and a dedicated hardware circuit that executes the remaining processes are provided. (c) A dedicated hardware circuit that executes all of the above processes is provided. Here, the software execution device including the processing device and the program storage device or the dedicated hardware circuit may be provided in plurals. That is, the above processes may be performed by processing circuitry including at least one of one or more software execution devices and one or more dedicated hardware circuits. The program storage device, that is, a computer readable medium includes various usable media that can be accessed with a general purpose or a dedicated computer.

Storage Device

In the embodiment described above, the storage device for storing the post-warm-up mapping data 76a, 126a and the warm-up mapping data 76b, 126b, and the storage device (ROM 74, 124) for storing the misfire program 74a and the misfire main program 124a are separate storage devices. However, this is not a limitation.

Computer

The computer is not limited to a computer that includes an execution device such as the CPU 72 and the ROM 74 mounted on the vehicle and an execution device such as CPU 122 and the ROM 124 provided in the center 120. For example, the computer may be formed by an execution device mounted on the vehicle and the execution device provided in the center 120, and an execution device such as CPU and ROM in a portable terminal of a user. This can be realized, for example, by performing the process of S62 in FIG. 10 as a process that transmits to the portable terminal of the user, and executing the processes of S46, S28 to S38 in (a) in FIG. 10 on the portable terminal. More specifically, an in-vehicle execution device configured by the CPU 72 and the ROM 74 may be configured not to execute the vehicle-side receiving process and the handling process. A reception execution device included in the portable terminal may be configured to execute at least the vehicle-side receiving process.

Internal Combustion Engine

In the embodiment descried above, the in-cylinder injection valve that injects fuel into the combustion chamber 18 is exemplified as the fuel injection valve, but is not limited thereto. The fuel injection valve may be, for example, a port injection valve that injects fuel into the intake passage 12. Furthermore, for example, both a port injection valve and an in-cylinder injection valve may be provided.

The internal combustion engine is not limited to a spark ignition type internal combustion engine, and may be a compression ignition type internal combustion engine using light oil or the like as fuel.

Vehicle

The vehicle is not limited to a series/parallel hybrid vehicle. For example, the vehicle may be a parallel hybrid vehicle or a series hybrid vehicle. Not limited to the hybrid vehicle, it may be a vehicle in which a device for generating thrust of the vehicle is only an internal combustion engine.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A misfire detection device for an internal combustion engine, the misfire detection device comprising:
a storage device; and
processing circuitry, wherein
the storage device stores first mapping data corresponding to a case where a warm-up process is being executed on a catalyst arranged in an exhaust passage of an internal combustion engine, and second mapping data corresponding to a case where the warm-up process is not being executed, each of the first mapping data and the second mapping data defines a mapping that outputs a misfire variable using a rotation waveform variable as an input, wherein the misfire variable is a variable related to a probability of occurrence of misfire,
the processing circuitry is configured to execute
an acquisition process that acquires the rotation waveform variable based on a detection value of a sensor configured to detect a rotational behavior of a crankshaft of the internal combustion engine,
a determination process that determines whether the misfire is present based on an output of the mapping using the variable acquired by the acquisition process as an input,
a handling process that handles the occurrence of a misfire by operating predetermined hardware in a case where it is determined that the misfire has occurred in the determination process, and
a selecting process that selects one of the first mapping data and the second mapping data used in the determination process in accordance with whether the warm-up process has been executed,
an interval between angles at which compression top dead centers are reached in the internal combustion engine is a reaching interval,
a plurality of angular intervals smaller than the reaching interval are a plurality of minute angular intervals, a rotational speed of the crankshaft at each of the plurality of minute angular intervals is an instantaneous speed, and a variable related to the instantaneous speed is an instantaneous speed variable, the rotation waveform variable is a variable indicating a difference between a plurality of values of an instantaneous speed variable respectively corresponding to a plurality of different minute angular intervals, and the mapping outputs a value of the misfire variable by performing a join operation of the value of the rotation waveform variable and a parameter learned by machine learning.

2. The misfire detection device according to claim 1, wherein input of the mapping defined by the first mapping data for when the warm-up process is executed includes a warm-up operation amount variable that is a variable related to an operation amount of an operation unit of the internal combustion engine by the warm-up process, the acquisition process includes a process that acquires the warm-up operation amount variable when the warm-up process is executed, and the determination process includes a process that determines presence of the misfire based on the output of the mapping that further uses the warm-up operation amount variable acquired by the acquisition process as the input when the warm-up process is executed.

3. The misfire detection device according to claim 2, wherein the warm-up process includes a process that retards an ignition timing as compared with when the warm-up process is not executed, and the warm-up operation amount variable acquired by the acquisition process includes a variable related to a retarded amount of the ignition timing.

4. The misfire detection device according to claim 2, wherein the internal combustion engine includes a valve characteristic variable device that allows valve characteristics of an intake valve to be varied, the warm-up process includes a process that operates the valve characteristic variable device, and the warm-up operation amount variable acquired by the acquisition process includes a valve characteristic variable that is a variable related to the valve characteristics.

5. The misfire detection device according to claim 2, wherein the warm-up process includes a process that changes an air-fuel ratio of an air-fuel mixture combusted in a combustion chamber of the internal combustion engine according to a progress status of the warm-up process, and the warm-up operation amount variable acquired by the acquisition process includes an air-fuel ratio variable that is a variable related to the air-fuel ratio.

6. The misfire detection device according to claim 1, wherein the input of the mapping includes an operating point variable that is a variable defining an operating point of the internal combustion engine, the acquisition process includes a process that acquires the operating point variable, the determination process is a process that determines the presence of the misfire based on the output of the mapping that further uses the operating point variable acquired by the acquisition process as the input, and the mapping outputs a value of the misfire variable by performing a join operation of the rotation waveform variable, the operating point variable, and the parameter learned by the machine learning.

7. A misfire detection system for an internal combustion engine, the misfire detection system comprising:

the processing circuitry and the storage device according to claim 1, wherein the determination process includes an output value calculation process of calculating an output value of the mapping using a variable acquired by the acquisition process as the input, the processing circuitry includes a first execution device and a second execution device, the first execution device is at least partially mounted on the vehicle and configured to execute the acquisition process, a vehicle-side transmitting process that transmits data acquired by the acquisition process to the outside of the vehicle, a vehicle-side receiving process that receives a signal based on a calculation result of the output value calculation process, and the handling process, and the second execution device is disposed outside the vehicle and configured to execute an external-side receiving process that receives data transmitted by the vehicle-side transmitting process, the output value calculation process, the selecting process, and an external-side transmitting process that transmits a signal based on a calculation result of the output value calculation process to the vehicle.

8. A data analyzer comprising the second execution device and the storage device according to claim 7.

9. A controller for an internal combustion engine, comprising the first execution device according to claim 7.

10. A misfire detection method for an internal combustion engine, wherein the acquisition process, the determination process, and the handling process according to claim 1 are executed by a computer.

11. A reception execution device in a misfire detection system for an internal combustion engine according to claim 7, wherein the first execution device includes an in-vehicle execution device mounted on a vehicle, and a reception execution device that is separate from the in-vehicle execution device, the in-vehicle execution device is configured to execute the acquisition process and a vehicle-side transmitting process that transmits data acquired by the acquisition process to outside of the vehicle, and the reception execution device is provided in a portable terminal and configured to execute at least the vehicle-side receiving process.

* * * * *